(12) United States Patent  
Kawakubo et al.

(10) Patent No.: US 8,189,319 B2
(45) Date of Patent: May 29, 2012

(54) MEMS VARIABLE CAPACITOR HAVING A PIEZOELECTRIC ACTUATION MECHANISM BASED ON A PIEZOELECTRIC THIN FILM

(75) Inventors: Takashi Kawakubo, Kanagawa-ken (JP); Toshihiko Nagano, Kanagawa-ken (JP); Michihiko Nishigaki, Kanagawa-ken (JP); Kazuhiko Itaya, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 560 days.

(21) Appl. No.: 12/400,815

(22) Filed: Mar. 10, 2009

(65) Prior Publication Data

US 2009/0296308 A1  Dec. 3, 2009

(30) Foreign Application Priority Data

May 30, 2008 (JP) ................................. 2008-142589

(51) Int. Cl.
*H01G 5/16* (2006.01)
*H01G 7/00* (2006.01)
(52) U.S. Cl. ........................................ 361/290; 361/280
(58) Field of Classification Search .................. 361/277, 361/287, 290, 280
See application file for complete search history.

(56) References Cited

U.S. PATENT DOCUMENTS

| | | | | |
|---|---|---|---|---|
| 5,880,921 | A * | 3/1999 | Tham et al. | 361/233 |
| 6,307,452 | B1 * | 10/2001 | Sun | 333/262 |
| 6,806,545 | B2 * | 10/2004 | Shim | 257/420 |
| 6,997,054 | B2 * | 2/2006 | Tsugai | 73/504.12 |
| 7,142,076 | B2 * | 11/2006 | Feng et al. | 335/78 |
| 7,420,318 | B1 * | 9/2008 | Pulskamp | 310/328 |
| 2006/0055287 | A1 | 3/2006 | Kawakubo et al. | |
| 2006/0285255 | A1 | 12/2006 | Kawakubo et al. | |
| 2007/0206340 | A1 * | 9/2007 | Shimanouchi et al. | 361/272 |
| 2007/0228887 | A1 | 10/2007 | Nishigaki et al. | |
| 2008/0042521 | A1 | 2/2008 | Kawakubo et al. | |
| 2008/0218077 | A1 | 9/2008 | Sakai et al. | |
| 2008/0238257 | A1 | 10/2008 | Kawakubo et al. | |
| 2009/0051251 | A1 | 2/2009 | Kawakubo et al. | |
| 2009/0189487 | A1 | 7/2009 | Nishigaki et al. | |

FOREIGN PATENT DOCUMENTS

| | | |
|---|---|---|
| JP | 2006-087231 | 3/2006 |
| JP | 2008-005642 | 1/2008 |

* cited by examiner

*Primary Examiner* — Eric Thomas
*Assistant Examiner* — David M Sinclair
(74) *Attorney, Agent, or Firm* — Turocy & Watson, LLP

(57) ABSTRACT

A MEMS variable capacitor includes: a first connection beam having one end fixed to a substrate; a first actuation beam connected to the first connection beam; a second actuation beam connected to the first actuation beam and extending in a reverse direction; a second connection beam having one end fixed to the substrate; a third actuation beam connected to the second connection beam; a fourth actuation beam connected to the third actuation beam and extending in a reverse direction; a movable electrode provided between the second and fourth actuation beams; and a fixed electrode provided on the substrate opposed to the movable electrode. The first to fourth actuation beams have a piezoelectric film sandwiched between a lower electrode and an upper electrode, the first and third actuation beams are placed on a line, the second and fourth actuation beams are placed on a line, and the first and second actuation beams and the third and fourth actuation beams are placed symmetrically about a line.

8 Claims, 18 Drawing Sheets

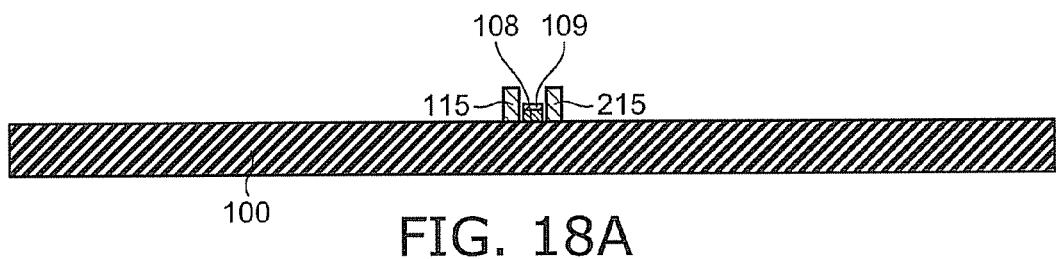
FIG. 18A
FIG. 18B
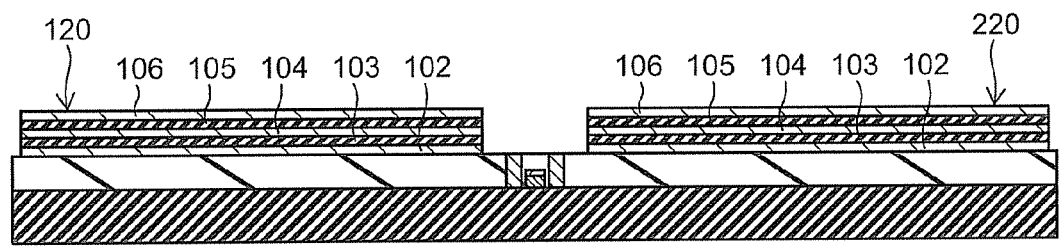
FIG. 18C
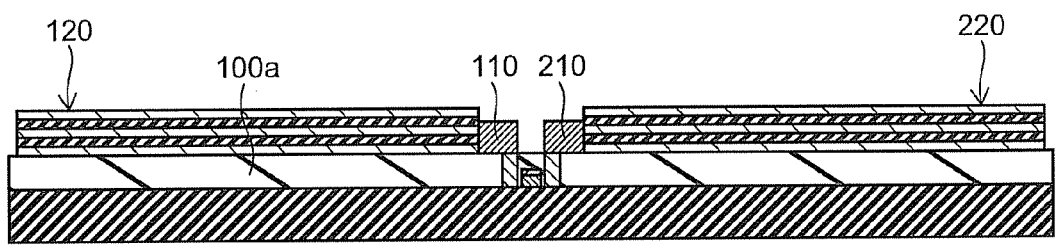
FIG. 19A
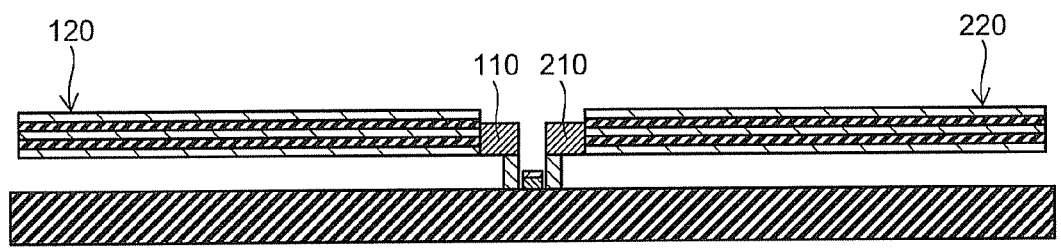
FIG. 19B

MEMS VARIABLE CAPACITOR HAVING A PIEZOELECTRIC ACTUATION MECHANISM BASED ON A PIEZOELECTRIC THIN FILM

CROSS-REFERENCE TO RELATED APPLICATIONS

This application is based upon and claims the benefit of priority from the prior Japanese Patent Application No. 2008-142589, filed on May 30, 2008; the entire contents of which are incorporated herein by reference.

BACKGROUND OF THE INVENTION

1. Field of the Invention

This invention relates to a MEMS (Micro-electromechanical System) variable capacitor having a piezoelectric actuation mechanism based on a piezoelectric thin film.

2. Background Art

In recent years, a variable capacitor and a switch based on an actuator fabricated by MEMS technique have been receiving attention. That is, a movable electrode is formed on a beam supported in air above a substrate, a fixed electrode is formed on a facing substrate, and then the variable capacitor and the switch are constituted so that actuating the beam by an electrostatic force, a thermal stress, an electromagnetic force and a piezoelectric force varies a distance between the movable electrode and the fixed electrode.

Among them, those using a piezoelectric inverse action as an actuating force for the movable beam have a lot of advantages, because they can vary the distance between the movable electrode and the fixed electrode continuously and largely and thus a capacitance variation coefficient can be large. Moreover, air or gas is used as a dielectric material and thus an extremely large Q-value is achieved.

Moreover, these variable capacitor structures are used just as it is and the variable electrode and the fixed electrode are brought together at a distance of an extremely thin dielectric film, and thereby it is also possible to provide the capacitor with the function of a capacitive type switch. Compared with a semiconductor switch, the switch created by this MEMS technique has both a low ON-resistance and a highly insulating separation characteristic at OFF, and thus after all has been receiving attention.

However, the MEMS capacitor based on a piezoelectric actuation mechanism has a long thin beam structure supported in air and including a piezoelectric layer sandwiched between an upper and lower electrodes. Consequently, there is a serious problem that the beam is warped up and down by a small amount of residual stress of materials constituting the beam. Therefore, it is very difficult to create a capacity value of the variable capacitor before/after voltage application as designed.

For example, PZT (lead zirconium titanate) known as a piezoelectric film having large electrostriction effect needs to be formed at room temperature and annealed at about 600° C. in order to a well-defined film quality, but the annealing causes volume contraction and the residual strain inevitably increases.

Conversely, film formation is possible near room temperature, and as for AlN (aluminum nitride) and ZnO (zinc oxide) serving as a piezoelectric film which relatively precise control of the residual stress in the film formation is possible depending on a film formation condition, the electrostriction effect is one order of magnitude smaller than PZT.

Therefore, there is a conflicting problem that materials having a large electrostriction effect is difficult to control the residual strain and materials relatively easy to control the residual strain has a small electrostriction effect. This is one of the largest problem preventing industrial application of a piezoelectric drive MEMS variable capacitor.

Inventors have already invented a piezoelectric actuator having a folded type structure (see JP-A 2006-87231 (Kokai)). This folded type piezoelectric actuator includes a first beam having one end fixed to a substrate, another end serving as a connection end, and a piezoelectric film sandwiched between a pair of electrode films, a second beam having one end serving as a connection end, extending from the connection end in an opposite direction to the first beam, having another end serving as an action end and essentially the same structure and dimensions as the first beam, and a fixed electrode placed on the substrate opposed to the action end. That is, the folded structure is fabricated by placing two beams having the same structure and shape in parallel and connecting end portions mutually, thereby even if beams are warped by the residual stress in the film formation, it becomes possible to cancel the warp, because two beams warp simultaneously.

Inventors have further invented a piezoelectric actuator having a W type folded structure, which two piezoelectric actuators having the folded structure are placed symmetrically about a line and the action ends are mutually connected in order to solve exactly the warp correction effect caused by the folded structure (see JP-A 2008-5642 (Kokai)). They have succeeded in suppressing the warp of the beams to 1% or less by this W type folded structure.

These inventions have almost resolved the warp problem of the piezoelectric actuator, but a portion of the movable electrode is also based on a unimorph structure made of a lower electrode/a piezoelectric film/an upper electrode/a support film similar to the actuator or a bimorph structure made of a lower electrode/a lower piezoelectric film/an upper piezoelectric film/an upper electrode, therefore, there is also a problem that slight residual stress produces a warp on the movable electrode portion and even if the movable electrode contacts the fixed electrode by the piezoelectric actuator, only part of the movable electrode closely contacts and the maximum capacity value is small.

Moreover, there has been a problem that a difference of thermal expansion coefficient between the movable electrode and the substrate produces a difference of dimension between the movable electrode and the substrate, for example, at a high temperature and low temperature, thus a stress of contraction or extension is applied to the movable electrode, the movable electrode is deformed and a contact area between the movable electrode and the fixed electrode is reduced.

SUMMARY OF THE INVENTION

According to an aspect of the invention, there is provided a MEMS variable capacitor including: a first connection beam having one end fixed to a substrate and another end served as a connection beam end; a first actuation beam having one end connected to the first connection beam end, another end served as a first connection end and a dielectric film sandwiched between a lower electrode and an upper electrode; a second actuation beam having one end served as a second connection end connected to the first connection end, extending from the second connection end in a parallel and reverse direction to the first actuation beam, and having another end served as a first action end and a piezoelectric film sandwiched between a lower electrode and an upper electrode; a second connection beam having one end fixed to the substrate and another end served as a second connection beam end; a third actuation beam having one end connected to the second connection beam end, another end served as a third connection end and a piezoelectric film sandwiched between a lower electrode and an upper electrode; a fourth actuation beam having one end served as a fourth connection end connected to the third connection end, extending from the fourth connection end in a parallel and reverse direction to the third actuation beam, having another end served as a second action end and a piezoelectric film sandwiched between a lower electrode and an upper electrode; a movable electrode provided between the first action end and the second action end; and a fixed electrode provided on the substrate opposed to the movable electrode, the first and third actuation beams being placed on a line, the second and fourth actuation beams being placed on a line, and the first and second actuation beams and the third and fourth actuation beams being placed symmetrically about a line.

According to another aspect of the invention, there is provided a MEMS variable capacitor including: a first actuation beam having one end fixed to a substrate, another end served as a first connection end and a piezoelectric film sandwiched between a lower electrode and an upper electrode; a second actuation beam having one end served as a second connection end connected to the first connection end, extending from the second connection end in a parallel and reverse direction to the first actuation beam, and having another end served as a first action end and a piezoelectric film sandwiched between a lower electrode and an upper electrode; a third actuation beam having one end fixed to the substrate, another end served as a third connection end and a piezoelectric film sandwiched between a lower electrode and an upper electrode; a fourth actuation beam having one end served as a fourth connection end connected to the third connection end, extending from the fourth connection end in a parallel and reverse direction to the third actuation beam, and having another end served as a second action end and a piezoelectric film sandwiched between a lower electrode and an upper electrode; a movable electrode provided between the first action end and the second action end, and having an equal thermal expansion coefficient to the substrate; and a fixed electrode provided on the substrate opposed to the movable electrode, the first and third actuation beams being placed on a line, the second and fourth actuation beams being place on a line, and the first and second actuation beams and the third and fourth actuation beams being placed symmetrically about a line.

According to another aspect of the invention, there is provided A MEMS variable capacitor including: a first actuation beam having one end fixed to a substrate, another end served as a first connection end and a piezoelectric film sandwiched between a lower electrode and an upper electrode; a second actuation beam having one end served as a second connection end connected to the first connection end, extending from the second connection end in a parallel and reverse direction to the first actuation beam, and having another end served as a first action end and a piezoelectric film sandwiched between a lower electrode and an upper electrode; a third actuation beam having one end fixed to the substrate, another end served as a third connection end and a piezoelectric film sandwiched between a lower electrode and an upper electrode; a fourth actuation beam having one end served as a fourth connection end connected to the third connection end, extending from the fourth connection end in a parallel and reverse direction to the third actuation beam, and having another end served as a second action end and a piezoelectric film sandwiched between a lower electrode and an upper electrode; a movable electrode provided between the first action end and the second action end, and made of a conductive monolayer; and a fixed electrode provided on the substrate opposed to the movable electrode, the first and third actuation beams being placed on a line, the second and fourth actuation beams being place on a line, and the first and second actuation beams and the third and fourth actuation beams being placed symmetrically about a line.

BRIEF DESCRIPTION OF THE DRAWINGS

FIGS. 18A to 18C are schematic cross-sectional views in process order illustrating a method for manufacturing the MEMS variable capacitor according to the first example of the invention;

FIGS. 19A and 19B are schematic cross-sectional views following FIGS. 18A to 18C;

DETAILED DESCRIPTION OF THE INVENTION

Figure 1A:
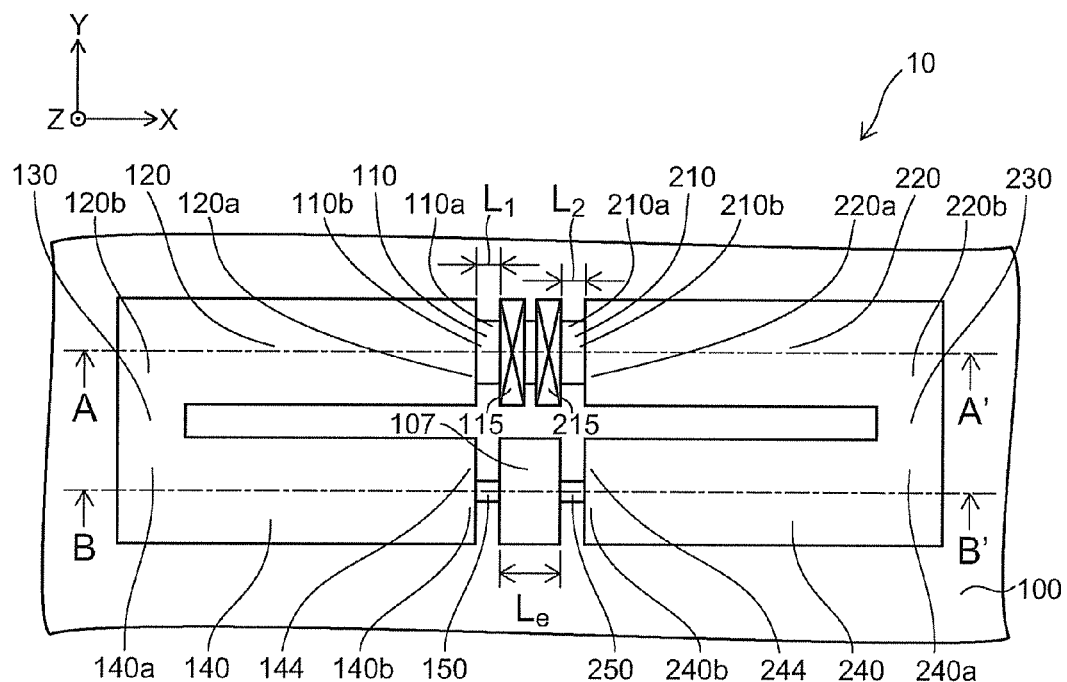
FIGS. 1A to 1C are schematic views illustrating the configuration of a MEMS variable capacitor according to a first embodiment of the invention.

An embodiment of the invention will now be described with reference to the drawings.

The drawings are schematic or conceptualistic, and the relation between a thickness and a width of each portion and the coefficient ratio of dimensions among portions are not always limited to the same as the real one. Even when showing the same portion, each other's different dimension and coefficient ratio may be used depending on the drawings.

Moreover, in the specification and each drawing, elements similar to those described above with reference to previous figures are marked with the same reference numerals and not described in detail as appropriate.

First Embodiment

Figure 1B:
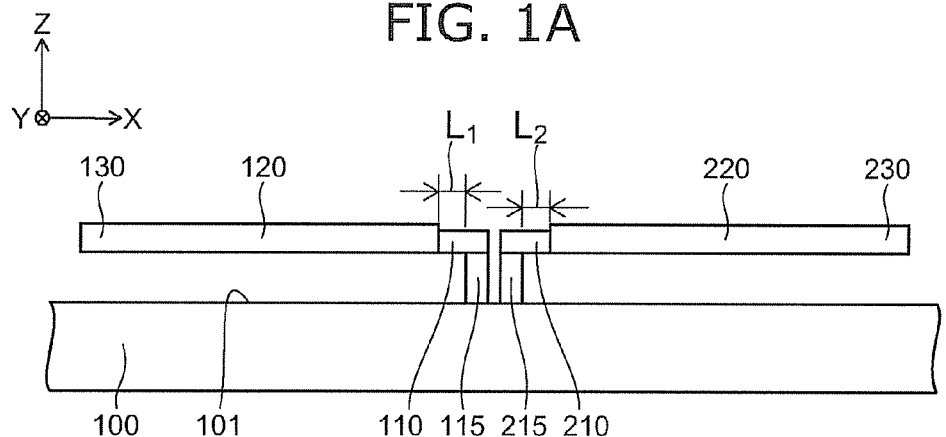
Figure 1C:
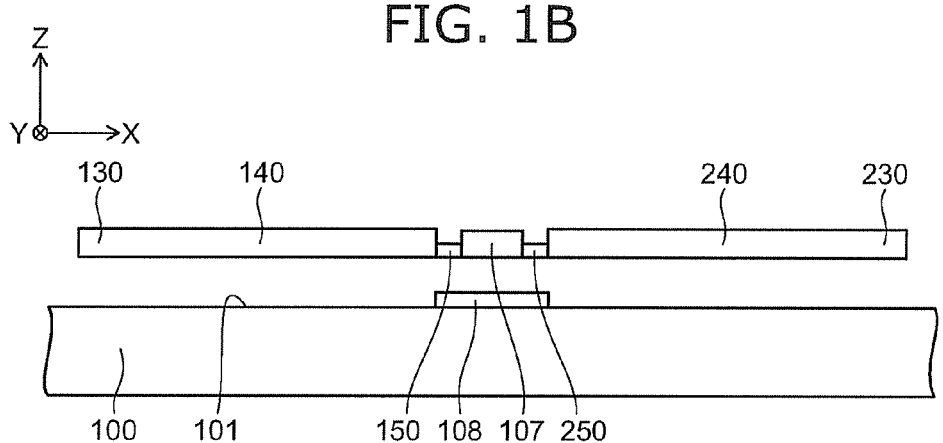

FIGS. 1A to 1C are schematic views illustrating the configuration of a MEMS variable capacitor according to a first embodiment of the invention.

That is, FIG. 1A is a schematic plan view, FIG. 1B is a cross-sectional view along A-A' line of FIG. 1A, FIG. 1C is a cross-sectional view along B-B' line of FIG. 1A.

As shown in FIGS. 1A to 1C, a direction perpendicular to a main surface 101 of a substrate 100 is taken to be a Z-axis direction, a direction perpendicular to the Z-axis and parallel to the main surface 101 is taken to be an X-axis direction and a direction perpendicular to the X-axis and the Z-axis is taken to be a Y-axis direction. In the following, a first direction is the X-axis direction and a second direction is the Y-axis direction.

As shown in FIGS. 1A to 1C, in the MEMS variable capacitor 10 according to the first embodiment of the invention, one end 110a of a first connection beam 110 is a fixed end and fixed to the substrate 100 through a first anchor 115.

Another end of the first connection beam 110 is served as a first connection beam end 110b and connected to a first actuation beam 120. Namely, the first connection beam end 110b is connected to one end 120a of the first actuation beam 120.

The first anchor 115, the first connection beam 110 and the first drive beam 120 described above are arrayed in series in the X-axis direction.

Another end of the first actuation beam 120 is served as a first connection end 120b and connected to a second actuation beam 140 through a first connection portion 130. That is, one end of the second actuation beam 140 is served as a second connection end 140a and connected to the first connection portion 130.

Moreover, another end 140b of the second actuation beam 140 is served as a first action end 144 and connected to one end of a first weak connection beam 150. Another end of the first weak connection beam 150 is connected to a movable electrode 107.

The second actuation beam 140, the first weak connection beam 150 and the movable electrode 107 are arrayed in series in the X-axis direction.

The first anchor 115, the first connection beam 110 and the first actuation beam 120 described above, and the second actuation beam 140, the first weak connection beam 150 and the movable electrode 107 described above are arrayed generally parallel to the X-axis direction each other and shifted in the Y-axis direction, and have a folded back structure connected each other by the first connection portion 130, namely, a 'U-shape'.

This holds the first connection beam 110, the first actuation beam 120, the first connection portion 130, the second actuation beam 140, the first weak connection beam 150 and the movable electrode 107 over the substrate 100 with a gap through the first anchor 115.

On the other hand, one end 210a of a second connection beam 210 is a fixed end and fixed to the substrate 100 through a second anchor 215.

Another end of the second connection beam 210 is served as a second connection beam end 210b and connected to a third actuation beam 220. That is, the second connection beam end 210b is connected with one end 220a of the third actuation beam 220.

The second anchor 215, the second connection beam 210 and the third actuation beam 220 described above are arrayed in series in the X-axis direction.

Another end of the third actuation beam 220 is served as a third connection end 220b and connected to a fourth actuation beam 240 by a second connection portion 230. That is, one end of the fourth actuation beam 240 is served as a fourth connection end 240a and connected to the second connection portion 230.

Moreover, another end 240b of the fourth actuation beam 240 is served as a second action end 244 and connected to one end of a second weak connection beam 250. Another end of the second weak connection beam 250 is connected to the movable electrode 107.

The fourth actuation beam 240, the second weak connection beam 250 and the movable electrode 107 are arrayed in series in the X-axis direction.

The second anchor 215, the second connection beam 210 and the third actuation beam 220 described above, and the fourth actuation beam 240, the second weak connection beam 250 and the movable electrode 107 described above are arrayed generally parallel to the X-axis direction and shifted in the Y-axis direction, and have the structure folded back and connected each other by the second connection portion 230, namely, a 'U-shape'.

This holds the second connection beam 210, the third actuation beam 220, the second connection portion 230, the fourth actuation beam 240, the second weak connection beam 250 and the movable electrode 107 over the substrate 100 with a gap through the second anchor 215.

Moreover, the first anchor 115, the first connection beam 110 and the first actuation beam 120, the second anchor 215, the second connection beam 210 and the third actuation beam 220 are aligned in generally the same line in the X-axis direction, the alignment order of the first anchor 115, the first connection beam 110 and the first actuation beam 120 is reverse to the alignment order of the second anchor 215, the second connection beam 210 and the third actuation beam 220. That is, for example, with going on the X-axis in a positive direction, the first actuation beam 120, the first connection beam 110, the first anchor 115, the second anchor 215, the second connection beam 210 and the third actuation beam 220 are arrayed in this order in generally the same line.

On the other hand, the second actuation beam 140 and the first weak connection beam 150, and the fourth actuation beam 240 and the second weak connection beam 250 are aligned in generally the same line in the X-axis direction, the alignment order of the second actuation beam 240 and the first weak connection beam 150 is reverse to the alignment order of the fourth actuation beam 240 and the second weak connection beam 250. That is, for example, with going on the X-axis in a positive direction, the second actuation beam 140, the first weak connection beam 150, the second weak connection beam 250 and the fourth actuation beam 240 are arrayed in this order in generally the same line.

As described above, the MEMS variable capacitor 10 according to this embodiment is the MEMS variable capacitor including: the first connection beam 110 having the one end 110a fixed on the substrate 100 and the another end served as the first connection beam end 110b; the first actuation beam 120 having the one end 120a connected to the first connection beam end 110b, the another end served as the first connection end 120b and a piezoelectric film sandwiched between a lower electrode and an upper electrode; the second actuation beam 140 having the one end served as the second connection end 140a connected to the first connection end 120b, extending from the second connection end 140a in a parallel and reverse direction to the first actuation beam 120, and having the another end 140b served as the first action end 144 and a piezoelectric film sandwiched between a lower electrode and an upper electrode; the second connection beam 210 having the one end 210a fixed to the substrate 100 and the another end served as the second connection beam end 210b; the third actuation beam 220 having the one end 220a connected to the second connection beam end 210b, the another end served as the third connection end 220b and a piezoelectric film sandwiched between a lower electrode and an upper electrode; the fourth actuation beam 240 having the one end served as the fourth connection end 240a connected to the third connection end 220b, extending from the fourth connection end 240a in a parallel and reverse direction to the third actuation beam 220, having the another end 240b served as the second action end 244 and a piezoelectric film sandwiched between a lower electrode and an upper electrode; the movable electrode 107 provided between the first action end 144 and the second action end 244; and the fixed electrode 108 provided on the substrate 100 opposed to the movable electrode 107, and the first and third actuation beams 120, 220 are placed on a line, the second and fourth actuation beams 140, 240 are placed on a line, and the first and second actuation beams 120, 140 and the third and fourth actuation beams 220, 240 are placed symmetrically about a line.

In the above, the first to fourth actuation beams 120, 140, 220, 240 can be illustratively based on a unimorph or bimorph type laminated structure body made of a piezoelectric film. By application of suitable voltage to these actuation beams, the movable electrode 107 shifts in the Z-axis direction to the main surface 101 of the substrate 100, and thereby the distance between the movable electrode 107 and the fixed electrode 108 changes and the function of the variable capacitor is achieved. In FIGS. 1B and 1C, the above laminated structure body made of the piezoelectric film is omitted.

The movable electrode 107 and the first and second connection beams 110, 210 can be formed of the same material or materials having generally the same thermal coefficient.

Thus, a dimension variation of the movable electrode 107 in the X-axis direction due to thermal expansion and a dimension variation of the first connection beam 110 and the second connection beam 210 in the X-axis direction due to thermal expansion are canceled out each other to reduce the dimension variation in the X-axis direction, and a stress placed on the movable electrode 107 due to the thermal expansion can be suppressed.

Herewith, even if temperature variation occurs in a wide temperature range, the gap between the movable electrode 107 and the substrate 100 is kept parallel, and the variation of the movable electrode 107 to the fixed electrode 108 becomes hard to be affected. Consequently, the variable capacitor having a large maximum capacity value with excellent reproducibility and reliability can be provided.

The thermal coefficients of various materials are listed below in unit of ppm/° C., 23.5 for aluminum (Al), 8.6 for titanium (Ti), 5.5 for zirconium (Zr), 6.0 for hafnium (Hf), 7.8 for vanadium (V), 7.2 for niobium (Nb), 6.5 for tantalum (Ta), 6.5 for chromium (Cr), 5.1 for molybdenum (Mo), 4.5 for tungsten (W), 6.8 for iridium (Ir), 9.0 for platinum (Pt), 2.5 for silicon (Si), 5.8 for germanium (Ge), 1.0 for carbon C, 0.5 for silicon oxide ($SiO_2$), and 8.2 for aluminum oxide ($Al_2O_3$).

When the movable electrode 107 is based on material having generally the same thermal coefficient as the first, second connection beams 110, 210, a combination of the above materials, for example, the materials with a difference within 30% in the thermal coefficient, more preferably within 10% can be used.

First Comparative Example

Figure 2:
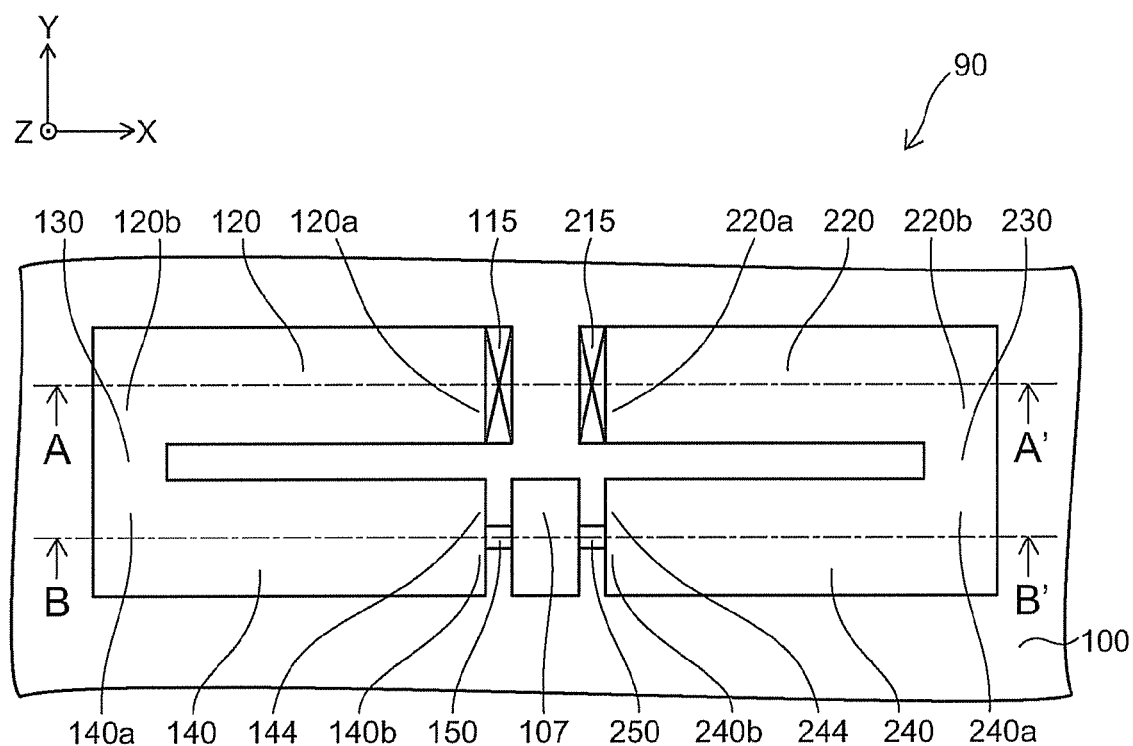
FIG. 2 is a schematic plan view illustrating the configuration of a MEMS variable capacitor of a first comparative example.

FIG. 2 is a schematic plan view illustrating the configuration of a MEMS variable capacitor of the first comparative example.

As shown in FIG. 2, comparing with the MEMS variable capacitor 10 according to this embodiment, the MEMS variable capacitor 90 of the first comparative example is not provided with the first connection beam 110 and the second connection beam 210, and is the same as the MEMS variable capacitor 10 except that point, thus not described in detail.

The MEMS variable capacitor 90 of the first comparative example is not provided with the first connection beam 110 and the second connection beam 210. Hence, when the temperature of the MEMS variable capacitor 90 changes, the dimension of the movable electrode 107 in the X-axis direction varies due to the thermal expansion or thermal contraction, and the stress in the X-axis direction is placed on the second actuation beam 140 and the fourth actuation beam 240. Hence, the first to fourth actuation beams 120, 140, 220, 240 deform, and consequently, the parallelism between the movable electrode 107 and the fixed electrode 108 and the distance between them vary. Therefore, the MEMS variable capacitor 90 of the comparative example cannot be used in the extended temperature range and is inferior in reproducibility and reliability.

On the contrary, in the MEMS variable capacitor 10 according to this embodiment, the movable electrode 107 is provided with the first, second connection beams 110, 210. Herewith, the dimension variation of the movable electrode 107 due to the thermal expansion can be compensated with the first, second connection beams 110, 210 and the stress placed on the movable electrode 107 can be suppressed.

The movable electrode 107 and the first, second connection beams 110, 210 are formed of the same material or the material having generally the same thermal expansion coefficient. Thus, the dimension variation of the movable electrode 107 due to the thermal expansion can be compensated with the first, second connection beams 110, 210 and the stress placed on the movable electrode 107 can be further suppressed.

Herewith, according to the MEMS variable capacitor 10, even if temperature variation occurs in a wide temperature range, the gap between the movable electrode 107 and the substrate 100 is kept parallel, and the variation of the movable electrode 107 to the fixed electrode 108 becomes hard to be affected. Consequently, the variable capacitor having a large maximum capacity value with reproducibility and reliability can be provided.

As shown in FIGS. 1A to 1C, it is preferable that a length $L_e$ of the movable electrode 107 in the X-axis direction is designed to be the same as the sum of a length $L_1$ in the X-axis direction of the first connection beam 110 except a portion laminated on the first anchor 115 and a length $L_2$ in the X-axis direction of the second connection beam 210 except a portion laminated on the second anchor 215.

As described above, by designing the lengths of the first connection beam 110, the second connection beam 210 and the movable electrode 107 so as to comply with a relation $L_e=L_1+L_2$, the dimension variation of the movable electrode 107 in the X-axis direction due to the thermal expansion in the case of the temperature change of the MEMS variable capacitor 10 can be compensated further accurately by the dimension variation of the first connection beam 110 and the second connection beam 210 in the X-axis direction due to the thermal expansion, and the dimension variation in the X-axis direction can be further reduced.

Moreover, in the MEMS variable capacitor 10 according to this embodiment, the first connection beam 110, the second connection beam 210 and the movable electrode 107 can be based on a monolayer body. For example, if a laminated film is used for the first connection beam 110, the second connection beam 210 and the movable electrode 107, in a case where the temperature of the MEMS variable capacitor 10 changes, differences of thermal expansion coefficients among materials constituting the laminated film occasionally cause a warp in the laminated film, however, if the monolayer body is used for the first connection beam 110, the second connection beam 210 and the movable electrode 107, the warp can be further preferably suppressed.

Moreover, if the laminated film is used for the first connection beam 110, the second connection beam 210 and the movable electrode 107, the residual stress in the manufacturing process occasionally causes a convex or concave warp of the first connection beam 110, the second connection beam 210 and the movable electrode 107 with respect to the substrate 100, however, if the monolayer body is used for the first connection beam 110, the second connection beam 210 and the movable electrode 107, the warp can be further preferably suppressed.

Furthermore, the first connection beam 110, the second connection beam 210 and the movable electrode 107 can be substantially based on a flat conductive monolayer. For example, a metal monolayer can be used. Hence, the conductivity can be provided, and it becomes easy to apply voltage on the laminated body of the piezoelectric film comprising the first to fourth actuation beams 120, 140, 220, 240 to actuate.

In the above, the first connection beam 110, the second connection beam 210 and the movable electrode 107 may behave as the monolayer body with respect to the temperature change and, for example, it is only desirable that an extremely thin another material is laminated on the monolayer material and hence the warp is not generated practically in spite of the temperature change.

Furthermore, bending stiffness of the first, second weak connection beams 150, 250 can be set to be smaller than bending stiffness of the first to fourth actuator beams 120, 140, 220, 240.

The bending stiffness of the first, second weak connection beams 150, 250 can be set to be smaller than bending stiffness of the movable electrode 107.

The bending stiffness of the first, second weak connection beams 150, 250 can be set to be smaller than bending stiffness of the first, second connection beams 110, 210.

For example, the first, second weak connection beams 150, 250 can be provided with a width (for example, a length in a perpendicular direction to an elongating direction) narrower than the first to fourth actuator beams 120, 140, 220, 240, the movable electrode 107, and the first, second connection beams 110, 210.

The first, second weak connection beams 150, 250 can be formed of the same material as the first to fourth actuation beams 120, 140, 220, 240 and the substrate 100 or the material having generally the same thermal expansion coefficient as the first to fourth actuation beams 120, 140, 220, 240 and the substrate 100. This can relax the stress due to the thermal expansion and the thermal contraction, and provide the further stable characteristics.

Second Embodiment

Figure 3:
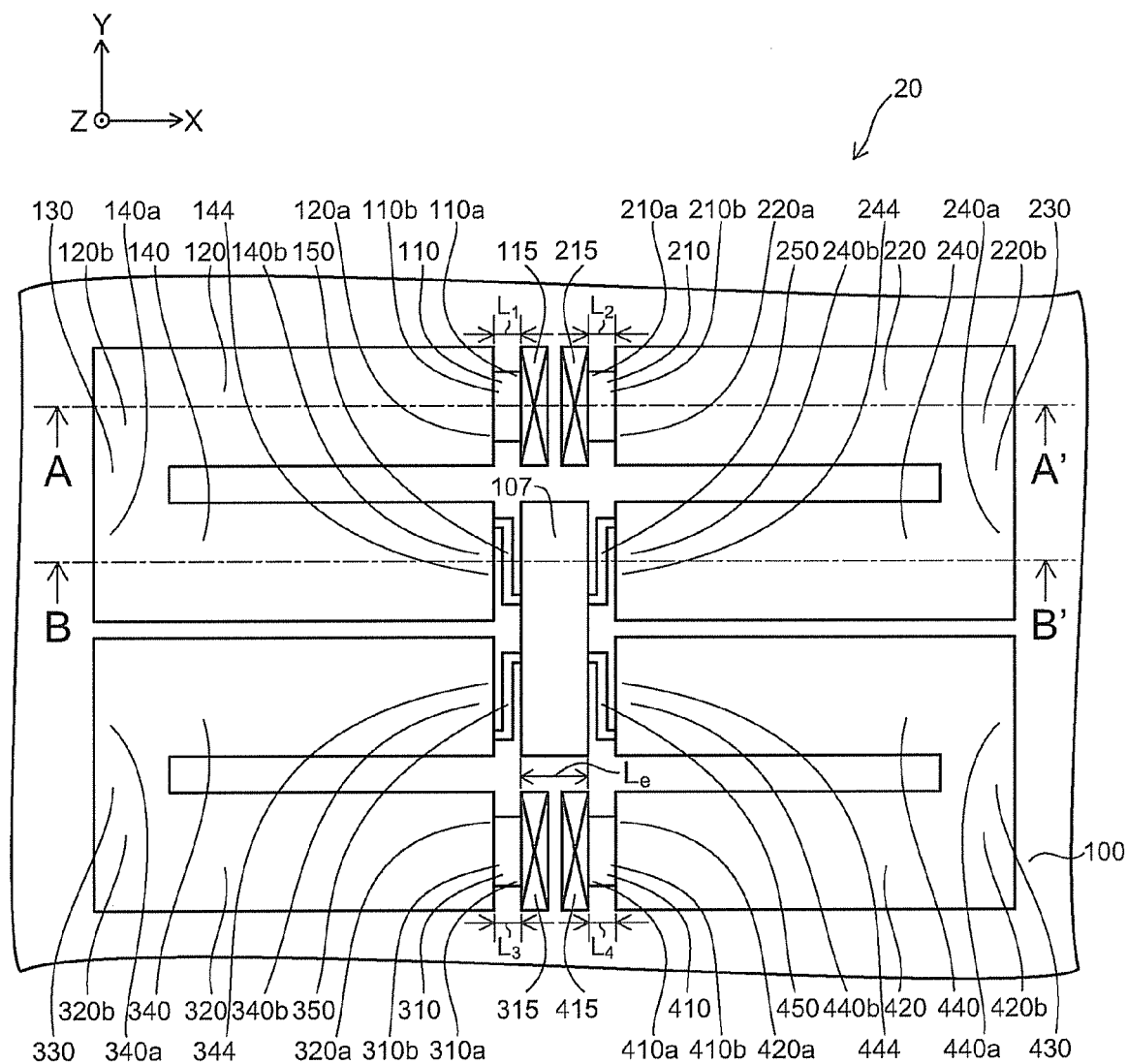
FIG. 3 is a schematic plan view illustrating the configuration of a MEMS variable capacitor according to a second embodiment of the invention.

FIG. 3 is a schematic plan view illustrating the configuration of a MEMS variable capacitor according to a second embodiment of the invention.

As shown in FIG. 3, the MEMS variable capacitor 20 according to the second embodiment of the invention is a combination of two groups of the MEMS variable capacitor according to the first embodiment.

In FIG. 3, the first anchor 115, the first connection beam 110, the first actuation beam 120, the first connection portion 130, the second actuation beam 140, the first weak connection beam 150 and the movable electrode 107, and the second anchor 215, the second connection beam 210, the third actuation beam 220, the second connection portion 230, the fourth actuation beam 240, the second weak connection beam 250 and the movable electrode 107 are similar to those of the MEMS variable capacitor 10, and thus the description is omitted.

The MEMS variable capacitor 20 has further includes the following.

One end 310a of a third connection beam 310 is a fixed end and fixed to the substrate 100 through a third anchor 315.

Another end of the third connection beam 310 is served as a third connection beam end 310b and connected to a fifth actuation beam 320. That is, the third connection beam end 310b is connected to one end 320a of the fifth actuation beam 320.

The above third anchor 315, the third connection beam 310 and the fifth actuation beam 320 are in series arrayed in the X-axis direction.

Another end of the fifth actuation beam 320 is served as a fifth connection end 320b and connected to a sixth actuation beam 340 through a third connection portion 330. That is, one end of the actuation beam 340 is served as a sixth connection end 340a and connected to the third connection portion 330.

Another end 340b of the sixth actuation beam 340 is a third action end 344 and connected to one end of a third weak connection beam 350. Another end of the third weak connection beam 350 is connected to the movable electrode 107.

The fifth actuation beam 320, the third weak connection beam 350 and the movable electrode 107 are in series arrayed in the X-axis direction.

The third anchor 315, the third connection beam 310 and the fifth actuation beam 320 described above, and the sixth actuation beam 340, the third weak connection beam 350 and the movable electrode 107 described above are arrayed generally parallel to the X-axis direction each other and shifted in the Y-axis direction, and have a folded back structure connected each other by the third connection portion 330.

This holds the third connection beam 310, the fifth actuation beam 320, the third connection portion 330, the sixth actuation beam 340, the third weak connection beam 350 and the movable electrode 107 over the substrate 100 with a gap through the third anchor 315.

In the above, the third anchor 315, the third connection beam 310 and the fifth actuation beam 320 are arranged at the second actuation beam 140 side of the first connection beam 110 and the first actuation beam 120. And the sixth actuation beam 340 and the third weak connection beam 350 are arranged between the third anchor 315, the third connection beam 310 and the fifth actuation beam 320, and the second actuation beam 140 and the first weak connection beam 150.

As described above, the first anchor 115, the first connection beam 110, the first actuation beam 120, the first connection portion 130, the second actuation beam 140, the first action end 144, the first weak connection beam 150, the movable electrode 107, the third weak connection beam 350, the third action end 344, the sixth actuation beam 340, the third connection portion 330, the fifth actuation beam 320, the third connection beam 310 and the third anchor 315 are sequentially connected in this order to form a 'W shape'.

It is noted that in the specific example illustrated in FIG. 3, the first action end 144 and the third action end 344 are separate, however like as a first example described later, the first action end 144 and the third action end 344 may be connected each other.

On the other hand, one end of 410a of a fourth connection beam 410 is a fixed end and fixed to the substrate 100 through a fourth anchor 415.

Another end of the fourth connection beam 410 is served as a fourth connection beam end 410b and connected to a seventh actuation beam 420. That is, the fourth connection beam end 410b is one end 420a of the seventh actuation beam 420.

The fourth anchor 415, the fourth connection beam 410 and the seventh actuation beam 420 described above are arrayed in series in the X-axis direction.

Another end of the seventh actuation beam 420 is served as a seventh connection end 420b and connected to an eighth actuation beam 440 through a fourth connection portion 430. That is, one end of the eighth actuation beam 440 is served as an eighth connection end 440a and connected to the fourth connection portion 430.

Another end 440b of the eighth actuation beam 440 is a fourth action end 444 and connected to one end of a fourth weak connection beam 450. Another end of the fourth weak connection beam 450 is connected to the movable electrode 107.

The eighth actuation beam 440, the fourth weak connection beam 450 and the movable electrode 107 are arrayed in series in the X-axis direction.

The fourth anchor 415, the fourth connection beam 410 and the seventh actuation beam 420 described above, and the eighth actuation beam 440, the fourth weak connection beam 450 and the movable electrode 107 described above are arrayed generally parallel to the X-axis direction each other and shifted in the Y-axis direction, and have a folded back structure connected each other by the fourth connection portion 430.

This holds the fourth connection beam 410, the seventh actuation beam 420, the fourth connection portion 430, the eighth actuation beam 440, the fourth weak connection beam 450 and the movable electrode 107 over the substrate 100 with a gap through the fourth anchor 415.

Moreover, the third anchor 1315, the third connection beam 310 and the fifth actuation beam 320, the fourth anchor 415, the fourth connection beam 410 and the seventh actuation beam 420 are aligned in generally the same line in the X-axis direction, the alignment order of the third anchor 315, the third connection beam 310 and the fifth actuation beam 320 is reverse to the alignment order of the fourth anchor 415, the fourth connection beam 410 and the seventh actuation beam 420. That is, for example, with going on the X-axis in a positive direction, the fifth actuation beam 320, the third connection beam 310, the third anchor 315, the fourth anchor 415, the fourth connection beam 410 and the seventh actuation beam 420 are arrayed in this order in generally the same line.

On the other hand, the sixth actuation beam 340 and the third weak connection beam 350, and the eighth actuation beam 440 and the fourth weak connection beam 450 are aligned in generally the same line in the X-axis direction, the alignment order of the sixth actuation beam 340 and the third weak connection beam 350 is reverse to the alignment order of the eighth actuation beam 440 and the fourth weak connection beam 450. That is, for example, with going on the X-axis in a positive direction, the sixth actuation beam 340, the third weak connection beam 350, the fourth weak connection beam 450 and the eighth actuation beam 440 are arrayed in this order in generally the same line.

In the above, the fourth anchor 415, the fourth connection beam 410 and the seventh actuation beam 420 are arranged at the fourth actuation beam 240 side of the second connection beam 210 and the third actuation beam 220. And the eighth actuation beam 440 and the fourth weak connection beam 450 are arranged between the fourth anchor 415, the fourth connection beam 410 and the seventh actuation beam 420, and the fourth actuation beam 240 and the second weak connection beam 250.

As described above, the second anchor 215, the second connection beam 210, the third actuation beam 220, the second connection portion 230, the fourth actuation beam 240, the second action end 244, the second weak connection beam 250, the movable electrode 107, the fourth weak connection beam 450, the fourth action end 444, the eighth actuation beam 440, the fourth connection portion 430, the seventh actuation beam 420, the fourth connection beam 410 and the fourth anchor 415 are sequentially connected in this order to form a 'W shape'.

It is noted that in the specific example illustrated in FIG. 3, the second action end 244 and the fourth action end 444 are separate, however like as the first example described later, the second action end 244 and the fourth action end 444 may be connected each other.

Moreover, a distance between the first anchor 115 and the second anchor 215 is smaller than a distance between the first connection portion 130 and the second connection portion 230, and a distance between the third anchor 315 and the fourth anchor 415 is smaller than a distance between the third connection portion 330 and the fourth connection portion 430. That is, the first to fourth anchors 115, 215, 315, 415 are close inward, the movable electrode 107 is provided therebetween and two groups of shapes in the 'W shape' which is symmetric with respect to a central line passing through the movable electrode 107 are combined.

Thus, the dimension variation of the movable electrode 107 in the X-axis direction due to thermal expansion and the dimension variation of the first connection beam 110 and the second connection beam 210 in the X-axis direction due to thermal expansion are canceled out each other. And the dimension variation of the movable electrode 107 in the X-axis direction due to thermal expansion and the dimension variation of the third connection beam 310 and the fourth connection beam 410 in the X-axis direction due to thermal expansion are canceled out each other. As a result, the stress placed on the movable electrode 107 due to the thermal expansion can be suppressed.

Furthermore, the MEMS variable capacitor 20 has the structure of the above 'W shape'. Hence, for example, the stress placed on the piezoelectric laminated film of the first to eighth actuation beams 120, 140, 220, 240, 320, 340, 420, 440 can be compensated in the Y-axis direction. Thus, the stress in the Y-axis direction placed on the movable electrode 107 can be compensated. That is, according to the MEMS variable capacitor 20, the stresses in the X-axis direction and the Y-axis direction acting on the movable electrode 107 in the case of the temperature change can be compensated.

Herewith, even if temperature variation occurs in a wide temperature range, the gap between the movable electrode 107 and the substrate 100 is kept more parallel, and the variation of the movable electrode 107 to the fixed electrode 108 can be more stabilized. Consequently, the variable capacitor having a large maximum capacity value with more excellent reproducibility and reliability can be provided.

The movable electrode 107 and the first to fourth connection beams 110, 210, 310, 410 can be formed of the same material or the material having generally the same thermal expansion coefficient.

Herewith, even if temperature variation occurs in a wide temperature range, the gap between the movable electrode 107 and the substrate 100 is kept more parallel, and the variation of the movable electrode 107 to the fixed electrode 108 can be more stabilized. Consequently, the variable capacitor having a large maximum capacity value with further excellent reproducibility and reliability can be provided.

Moreover, also in this case, as shown in FIG. 3, it is preferable that a length $L_e$ of the movable electrode 107 in the X-axis direction is designed to be the same as the sum of a length $L_1$ in the X-axis direction of the first connection beam 110 except a portion laminated on the first anchor 115 and a length $L_2$ in the X-axis direction of the second connection beam 210 except a portion laminated on the second anchor 215. At this time, a length $L_3$ in the X-axis direction of the third connection beam 310 except a portion laminated on the third anchor 315 can be the same as $L_1$, and a length $L_4$ in the X-axis direction of the fourth connection beam 410 except a portion laminated on the fourth anchor 415 can be the same as $L_2$.

That is, it is preferable that a length $L_e$ of the movable electrode 107 in the X-axis direction is designed to be the same as the sum of a length $L_3$ in the X-axis direction of the third connection beam 310 except a portion laminated on the third anchor 315 and a length $L_4$ in the X-axis direction of the fourth connection beam 410 except a portion laminated on the fourth anchor 415.

As described above, by designing the lengths of the first to fourth connection beam 110, 210, 310, 410 in the X-axis direction and the length of the movable electrode 107 in the X-axis direction so as to satisfy a relation of $L_e=L_1+L_2=L_3+L_4$, the dimension variation of the movable electrode 107 due to the thermal expansion in the X-axis direction in the case of the temperature change of the MEMS variable capacitor 10 can be compensated further accurately by the dimension variation of the first to fourth connection beam 110, 210, 310, 410 due to the thermal expansion in the X-axis direction, and the dimension variation in the X-axis direction can be further reduced.

Moreover, in the MEMS variable capacitor 20 according to this embodiment, the first to fourth connection beams 110, 210, 310, 410 and the movable electrode 107 can be based on a monolayer body. For example, if a laminated film is used for the first to fourth connection beams 110, 210, 310, 410 and the movable electrode 107, in a case where the temperature of the MEMS variable capacitor 20 changes, differences of thermal expansion coefficients among materials constituting the laminated film occasionally cause a warp in the laminated film, however, if the monolayer body is used for the first to fourth connection beams 110, 210, 310, 410 and the movable electrode 107, the warp can be further preferably suppressed.

Moreover, if the laminated film is used for the first to fourth connection beams 110, 210, 310, 410 and the movable electrode 107, the residual stress in the manufacturing process occasionally causes a convex or concave warp of the first to fourth connection beams 110, 210, 310, 410 and the movable electrode 107 with respect to the substrate 100, however, if the monolayer body is used for the first connection beams 110, 210, 310, 410 and the movable electrode 107, the warp can be further preferably suppressed.

Furthermore, the first connection beams 110, 210, 310, 410 and the movable electrode 107 can be substantially based on a flat conductive monolayer. For example, a metal monolayer can be used. Hence, the conductivity can be provided, and it becomes easy to apply voltage on the laminated body of the piezoelectric film comprising the first to fourth actuation beams 120, 140, 220, 240 to actuate.

In the above, the first to fourth connection beams 110, 210, 310, 410 and the movable electrode 107 may behave as the monolayer body with respect to the temperature change and, for example, it is only desirable that an extremely thin another material is laminated on the monolayer material and hence the warp is not generated practically in spite of the temperature change.

Furthermore, the bending stiffness of the first to fourth weak connection beams 150, 250, 350, 450 can be set to be smaller than the bending stiffness of the first to eighth actuator beams 120, 140, 220, 240, 320, 340, 420, 440.

The bending stiffness of the first to fourth weak connection beams 150, 250, 350, 450 can be set to be smaller than the bending stiffness of the movable electrode 107.

The bending stiffness of the first to fourth weak connection beams 150, 250, 350, 450 can be set to be smaller than the bending stiffness of the first to fourth connection beams 110, 210, 310, 410.

For example, the first to fourth weak connection beams 150, 250, 350, 450 can be provided with a width (for example, a length in a perpendicular direction to an elongating direction) narrower than the first to eighth actuator beams 120, 140, 220, 240, 320, 340, 420, 440, the movable electrode 107, and the first to fourth connection beams 110, 210, 310, 410.

The first to fourth weak connection beams 150, 250, 350, 450 can be formed of the same material as the first to eighth actuation beams 120, 140, 220, 240, 320, 340, 420, 440 and the substrate 100 or the material having generally the same thermal expansion coefficient as the first to eighth actuation beams 120, 140, 220, 240, 320, 340, 420, 440 and the substrate 100. This can relax the stress due to the thermal expansion and the thermal contraction, and provide the further stable characteristics.

Furthermore, in the above, it is further preferable that the connection portions of the first to fourth weak connection beams 150, 250, 350, 450, and the movable electrode 107 are close as shown in FIG. 3 so that the residual stress in the movable electrode 107 and the residual stresses in the first to eighth actuation beams have no influence on the distance between the movable electrode 107 and the fixed electrode 108 as much as possible.

Figure 4:
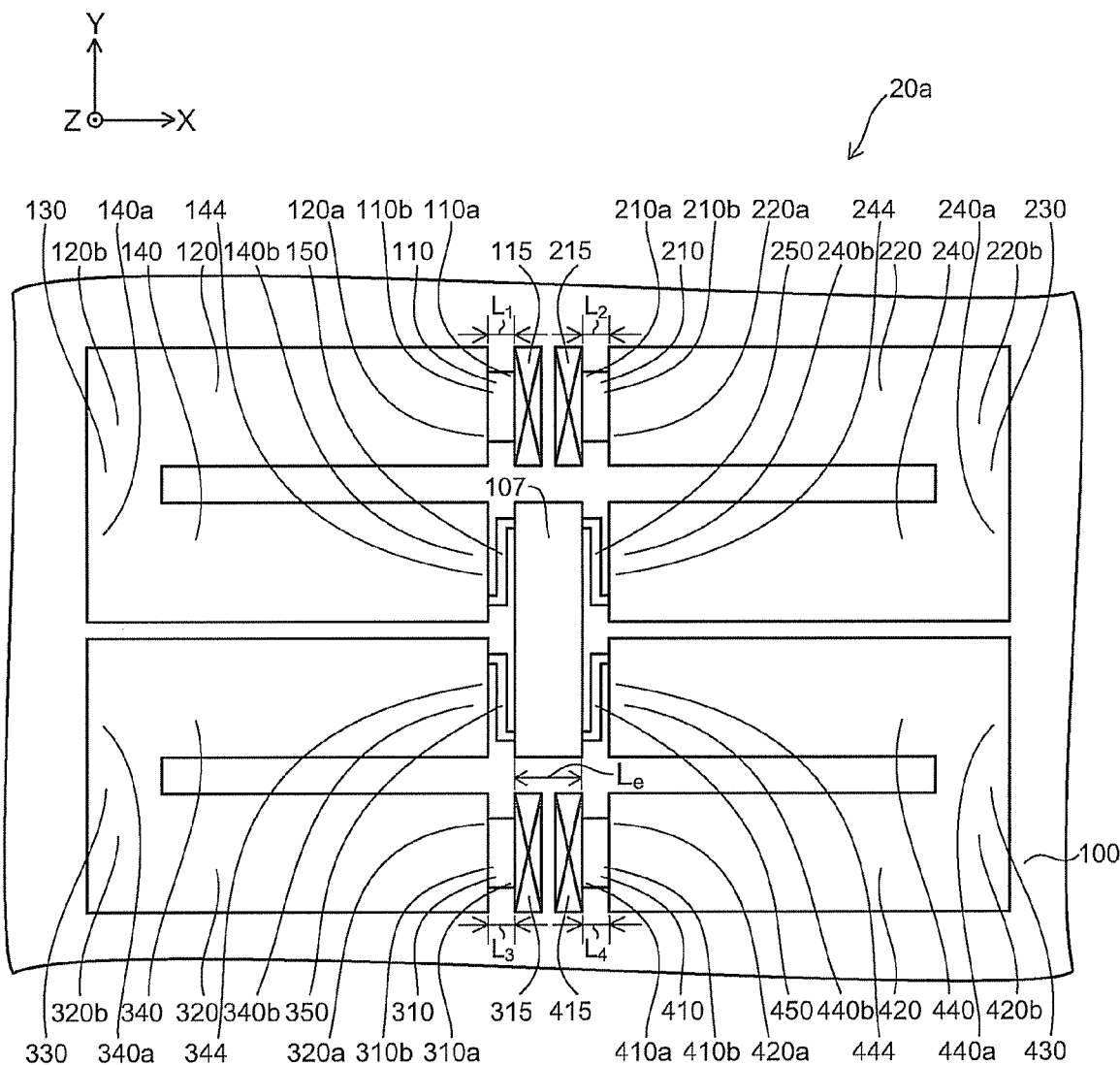
FIG. 4 is a schematic plan view illustrating the configuration of another MEMS variable capacitor according to the second embodiment of the invention.

FIG. 4 is a schematic plan view illustrating the configuration of another MEMS variable capacitor according to the second embodiment of the invention.

As shown in FIG. 4, in the another MEMS variable capacitor 20a according to the second embodiment of the invention, each other's distance between connection portions of the first to fourth weak connection beams 150, 250, 350, 450, and the movable is far away compared with the configuration illustrated in FIG. 3. As a result, in the case where a residual strain is generated in the movable electrode 107, and residual strains are generated in the first to eighth actuation beams, these strains deform easily the shape of the movable electrode 107, and the distance between the movable electrode 107 and the fixed electrode 108 occasionally varies.

However, also in the case illustrated in FIG. 4, this embodiment enables the distance between the movable electrode 107 and the fixed electrode 108 to be uniform in a wide temperature range by forming each actuation beam in the shape combining two groups of 'W shape' and providing with the first to fourth connection beams to compensate the effect of the strains. Thus, the MEMS variable capacitor can be provided, which brings the movable electrode into stable contact with the fixed electrode in a wide temperature range, and having a large maximum capacity value with excellent reproducibility and reliability.

However, the structure shown in FIG. 3 is further preferable.

Figure 5:
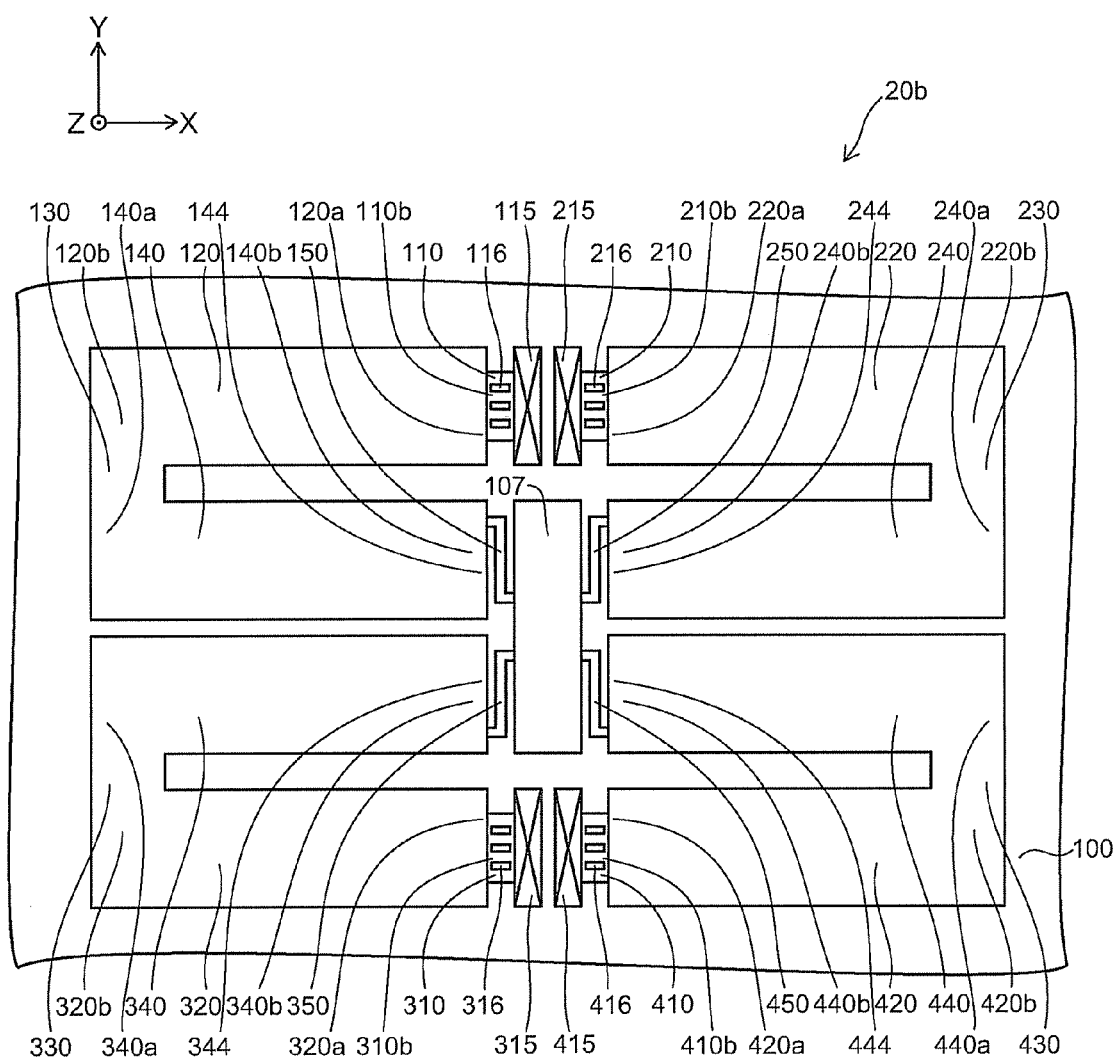
FIG. 5 is a schematic plan view illustrating the configuration of another MEMS variable capacitor according to the second embodiment of the invention.

FIG. 5 is a schematic plan view illustrating the configuration of another MEMS variable capacitor according to the second embodiment of the invention.

As shown in FIG. 4, in the another MEMS variable capacitor 20b, the first, second, third, fourth connection beams 110, 210, 310, 410 have a first, second, third, fourth slits 116, 216, 316, 416, respectively extending in an extending direction (X-axis direction) in parallel substantially. Thus, the stress in the Y-axis direction and the stress due to thermal expansion and thermal contraction can be relaxed, and further stable characteristics can be achieved.

The MEMS variable capacitor 20b according to this example can also provide the MEMS variable capacitor which brings the movable electrode into stable contact with the fixed electrode in a wide temperature range, and having a large maximum capacity value with excellent reproducibility and reliability.

Third Embodiment

Figure 6:
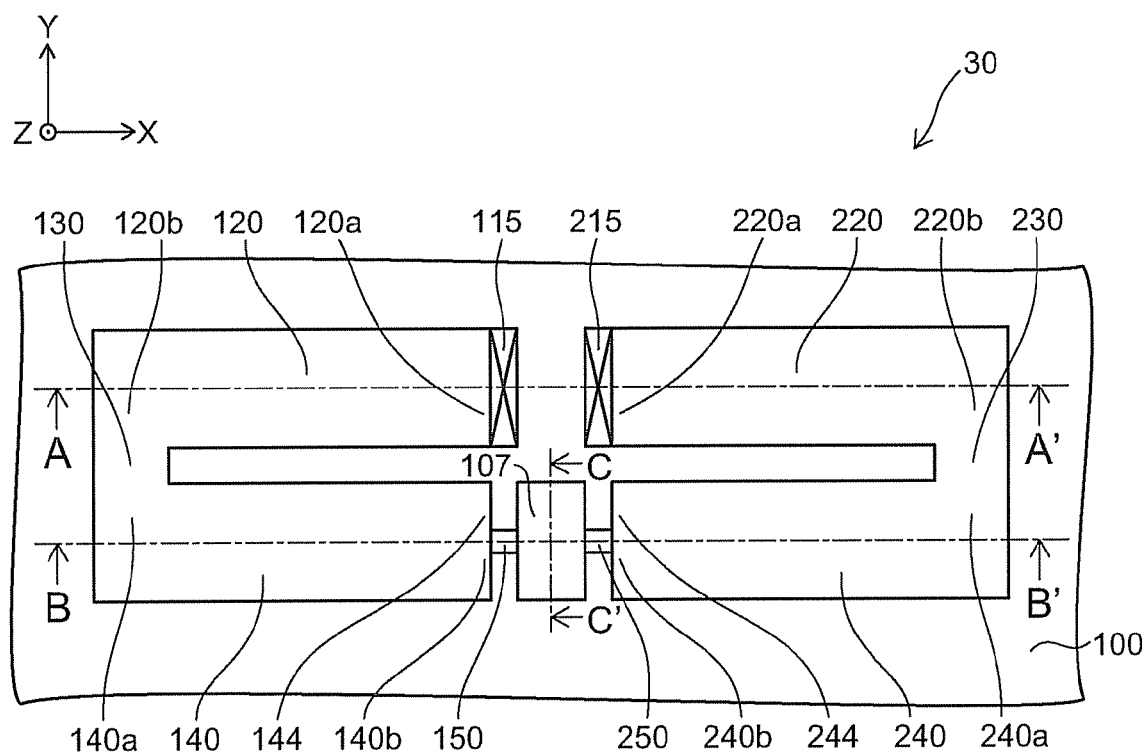
FIG. 6 is a schematic plan view illustrating the configuration of a MEMS variable capacitor according to a third embodiment of the invention.

FIG. 6 is a schematic plan view illustrating the configuration of a MEMS variable capacitor according to a third embodiment of the invention.

Figure 7:
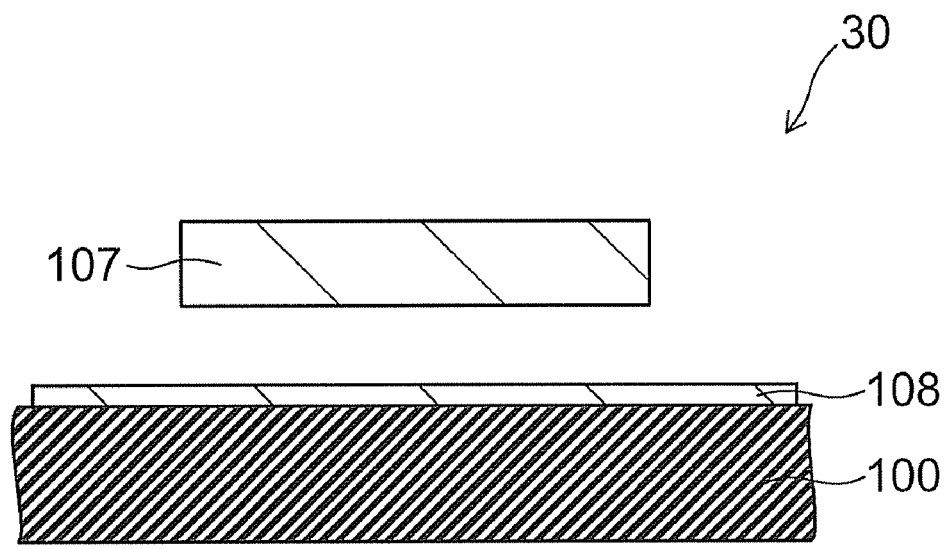
FIG. 7 is a cross-sectional view taken along C-C' line of FIG. 6.

FIG. 7 is a cross-sectional view taken along C-C' line of FIG. 6.

As shown in FIG. 6, the MEMS variable capacitor 30 according to the third embodiment is the MEMS variable capacitor including: the first actuation beam 120 having the one end 120a fixed on the substrate 100, the another end served as the first connection end 120b and the piezoelectric film sandwiched between the lower electrode and the upper electrode; the second actuation beam 140 having the one end served as the second connection end 140a connected to the first connection end 120b, extending from the second connection end 140a in the parallel and reverse direction to the first actuation beam 120, and having the another end 140b served as the first action end 144 and the piezoelectric film sandwiched between the lower electrode and the upper electrode; the third actuation beam 220 having the one end 120a fixed to the substrate 100, the another end served as the third connection end 220b and the piezoelectric film sandwiched between the lower electrode and the upper electrode; the fourth actuation beam 240 having the one end served as the fourth connection end 240a connected to the third connection end 220b, extending from the fourth connection end 240a in the parallel and reverse direction to the third actuation beam 220, and having the another end 240b served as the second action end 244 and the piezoelectric film sandwiched between the lower electrode and the upper electrode; the movable electrode 107 provided between the first action end 144 and the second action end 244 and made of a conductive monolayer; and the fixed electrode 108 provided on the substrate 100 opposed to the movable electrode 107, and the first and third actuation beams 120, 220 are placed on a line, the second and fourth actuation beams 140, 240 are placed on a line, and the first and second actuation beams 120, 140 and the third and fourth actuation beams 220, 240 are placed symmetrically about a line.

That is, the MEMS variable capacitor 30 according to this embodiment is not provided with the first to fourth connection beams 110, 210, 310, 410 and the conductive monolayer is used for the movable electrode 107, with respect to the MEMS variable capacitor 10 of the first embodiment. The conductive monolayer can be illustratively based on the metal monolayer.

The metal monolayer can includes illustratively at least one selected from a group composed of aluminum (Al), titanium (Ti), zirconium (Zr), Hafnium (Hf), vanadium (V), niobium (Nb), tantalum (ta), chromium (Cr), molybdenum (Mo), tungsten (W), iridium (Ir), platinum (Pt), silicon (Si), germanium (Ge) and carbon (C). Moreover, an alloy made of these materials can be used.

Hence, the MEMS variable capacitor can be achieved, which causes no residual stress on the movable electrode 107 and no warp on the movable electrode 107, holds the distance between the movable electrode 107 and the fixed electrode 108 constant, brings the movable electrode into stable contact with the fixed electrode in a wide temperature range, and has a large maximum capacity value with excellent reproducibility and reliability.

That is, as shown in FIG. 7, the MEMS variable capacitor 30 according to this embodiment holds the movable electrode 107 generally in parallel to the fixed electrode 108.

Figure 8:
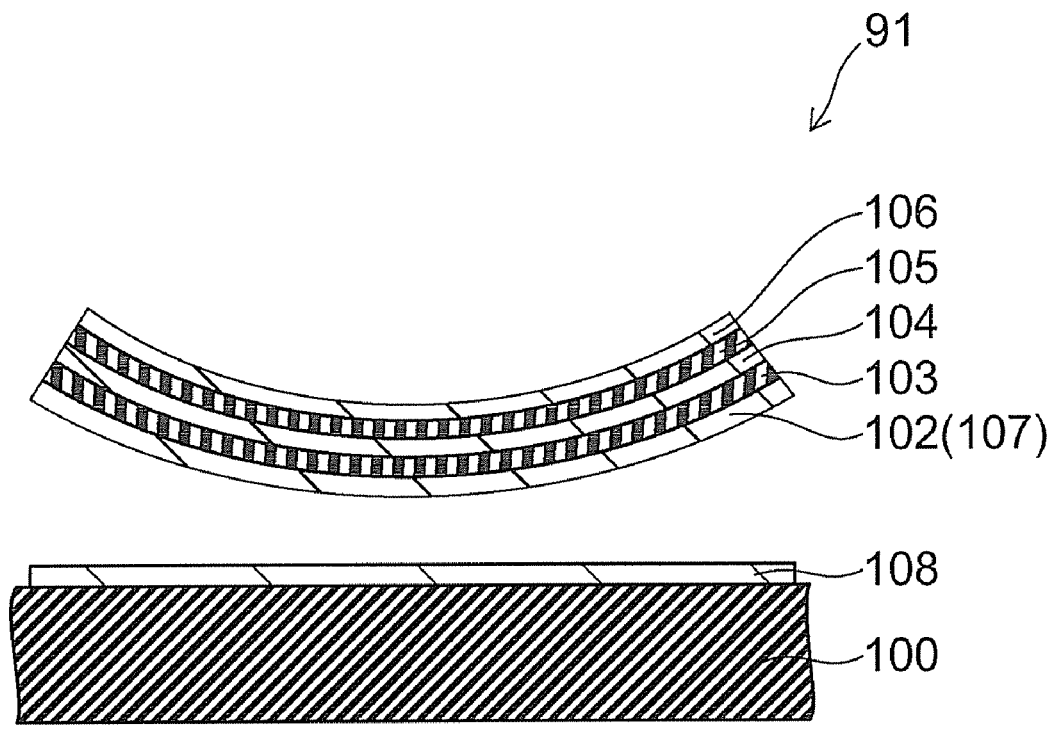
FIG. 8 is a schematic plan view illustrating the configuration of a MEMS variable capacitor of a second comparative example.

FIG. 8 is a schematic plan view illustrating the configuration of a MEMS variable capacitor of a second comparative example.

That is, the MEMS variable capacitor 91 of the second example has the movable electrode 107 served as a laminated structure with respect to the MEMS variable capacitor 30 according to this embodiment illustrated in FIG. 6 and FIG. 7. Namely, the MEMS variable capacitor 91 is provided with the movable electrode 107 based on the laminated structure body with five layers composed of a lower electrode 102, a lower piezoelectric film 103, an intermediate electrode 104, an upper piezoelectric film 105 and an upper electrode 106, and the lower electrode 102 facing the fixed electrode 108 and functioning as the movable electrode 107.

As shown in FIG. 8, in the MEMS variable capacitor 91 of the comparative example having the laminated structure like this, due to the residual strain in the laminated structure body the movable electrode 107 is not parallel to the fixed electrode 108, and warps in a convex or a concave with respect to the fixed electrode 108. When the MEMS variable capacitor 91 is at a high temperature of low temperature, the warp tends to increase the degree. Thus, in the case where the movable electrode 107 is made of the laminated structure body, the movable electrode 107 warps, and it is unable to bring the movable electrode 107 into stable contact with the fixed electrode 108.

On the contrary, as described previously, the MEMS variable capacitor 30 according to this embodiment is based on the conductive monolayer for the movable electrode 107. Hence, the warp is not generated on the movable electrode 107, and the MEMS variable capacitor can be provided, which brings the movable electrode into stable contact with the fixed electrode in a wide temperature range, and having a large maximum capacity value with excellent reproducibility and reliability.

Furthermore, as described in the second embodiment, the MEMS variable capacitor 30 according to this embodiment may have the structure combining two features of 'W shape'. Also in this case, the movable electrode 107 can be made of the conductive monolayer.

Figure 9:
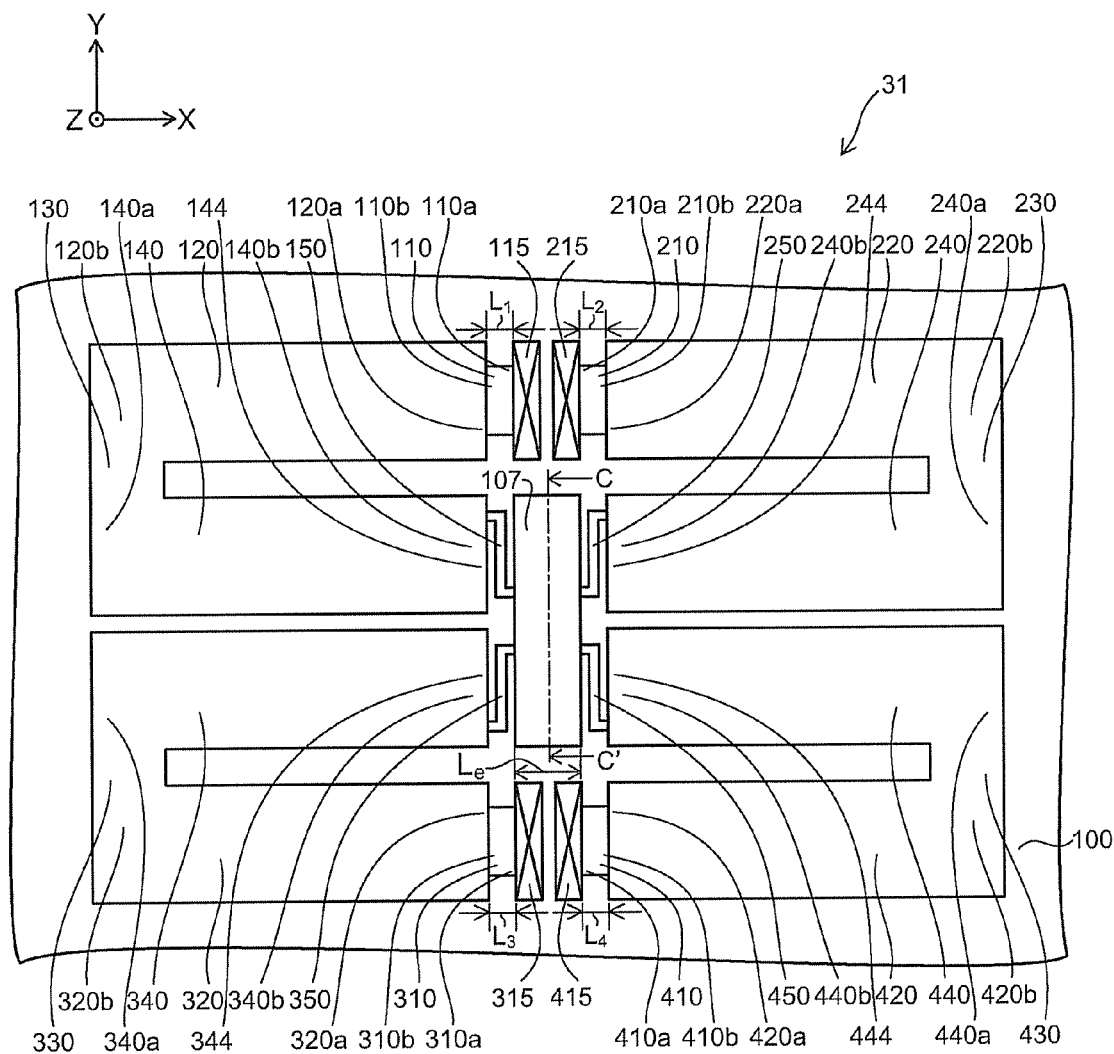
FIG. 9 is a schematic plan view illustrating the configuration of another MEMS variable capacitor according to the third embodiment of the invention.

FIG. 9 is a schematic plan view illustrating the configuration of another MEMS variable capacitor according to the third embodiment of the invention.

That is, as shown in FIG. 9, with respect to the MEMS variable capacitor 30 illustrated in FIG. 6, the MEMS variable capacitor 31 according to this embodiment further includes: the fifth actuation beam 320 having the one end 320a fixed to the substrate 100, the another end served as the fifth connection end 320b and the piezoelectric film sandwiched between the lower electrode and the upper electrode; the sixth actuation beam 340 having the one end served as the sixth connection end 340a connected to the fifth connection end 320b, extending from the sixth connection end 320a in the parallel and reverse direction to the fifth actuation beam 320, and having the another end 340b served as the second action end 344 and the piezoelectric film sandwiched between the lower electrode and the upper electrode; the seventh actuation beam 420 having the one end 420a fixed to the substrate, the another end served as the seventh connection end 420b, and the piezoelectric film sandwiched between the lower electrode and the upper electrode; and the eighth actuation beam 440 having the one end served as the eighth connection end 440a connected to the seventh connection end 420b, extending from the eighth connection end 420a in the parallel and reverse direction to the seventh actuation beam 420, and having the another end 440b served as the fourth action end 444 and the piezoelectric film sandwiched between the lower electrode and the upper electrode. And the movable electrode 107 is provided between the third action end 344 and the fourth action end 444, the fifth and seventh actuation beams 320, 340 are placed on a line, the sixth and eighth actuation beams 340, 440 are placed on a line, and the fifth and sixth actuation beams 320, 420 and the seventh and eighth actuation beams 420, 440 can be placed symmetrically about a line.

The configuration like this compensates the strain in the Y-axis direction, holds the distance between the movable electrode 107 and the fixed electrode 108 constant, and the MEMS variable capacitor can be provided, which brings the movable electrode into further stable contact with the fixed electrode, and having a large maximum capacity value with excellent reproducibility and reliability.

First Example

Hereinafter, a MEMS variable capacitor of a first example will be described.

The MEMS variable capacitor of the first example is a simultaneous work of the second embodiment and the third embodiment, has a feature combining two features of 'W shape' illustrated in FIG. 3, and furthermore the conductive monolayer is used for the first to fourth connection beams and the movable electrode.

Figure 10:
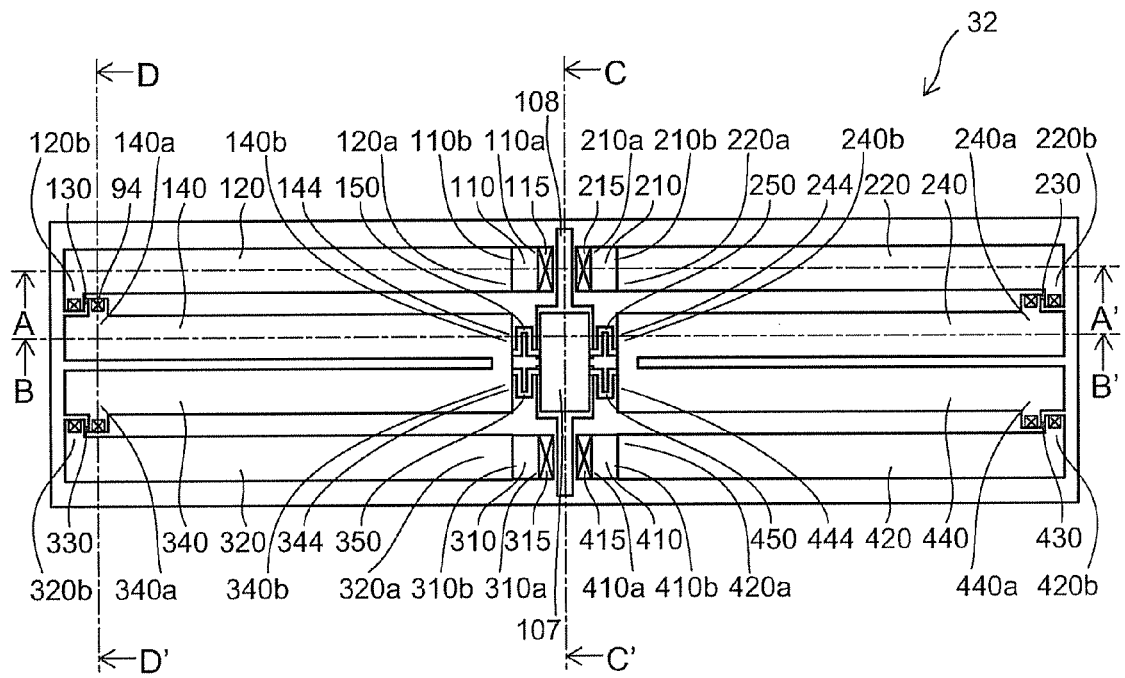
FIG. 10 is a schematic plan view illustrating the configuration of a MEMS variable capacitor according to a first example.

FIG. 10 is a schematic plan view illustrating the configuration of the MEMS variable capacitor according to the first example.

Figure 11:
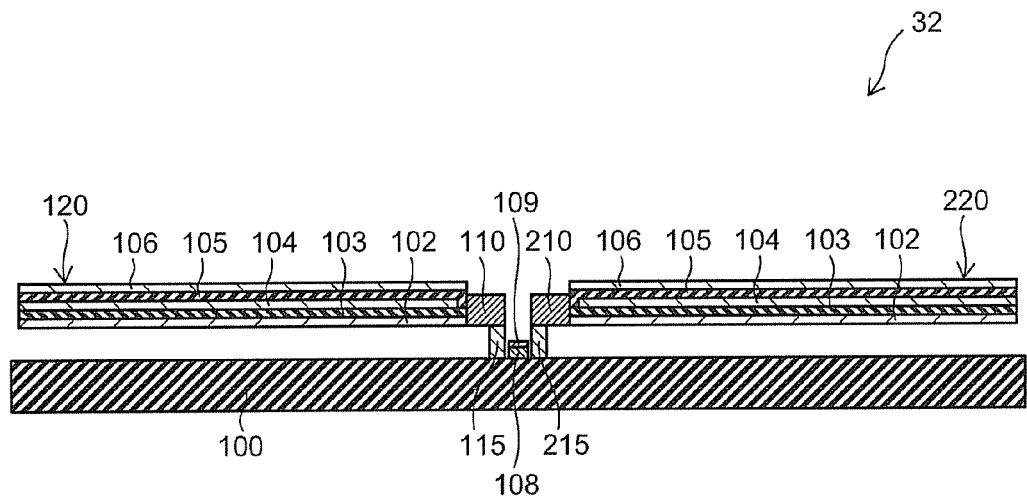
FIG. 11 is a cross-sectional view taken along A-A' line of FIG. 10.
Figure 12:
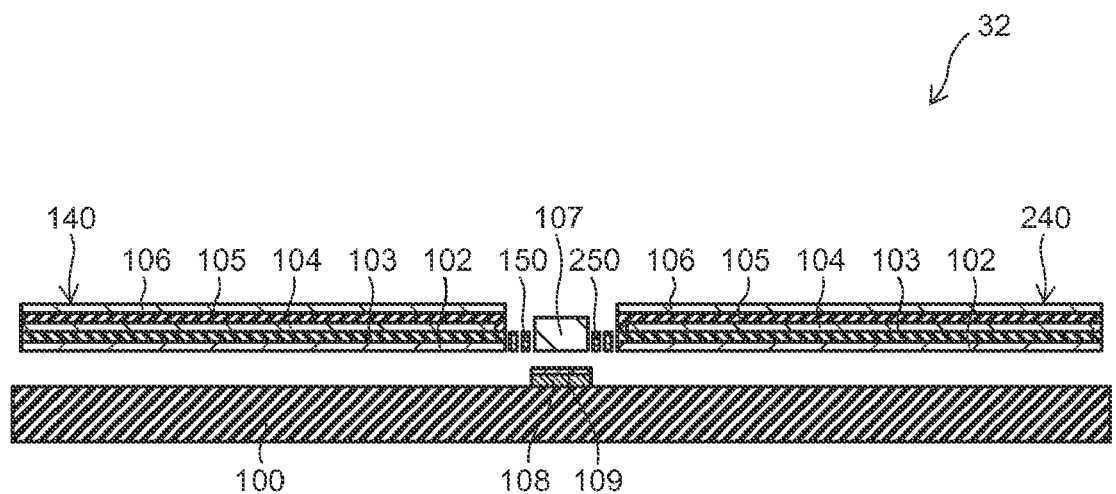
FIG. 12 is a cross-sectional view taken along B-B' line of FIG. 10.
Figure 13:
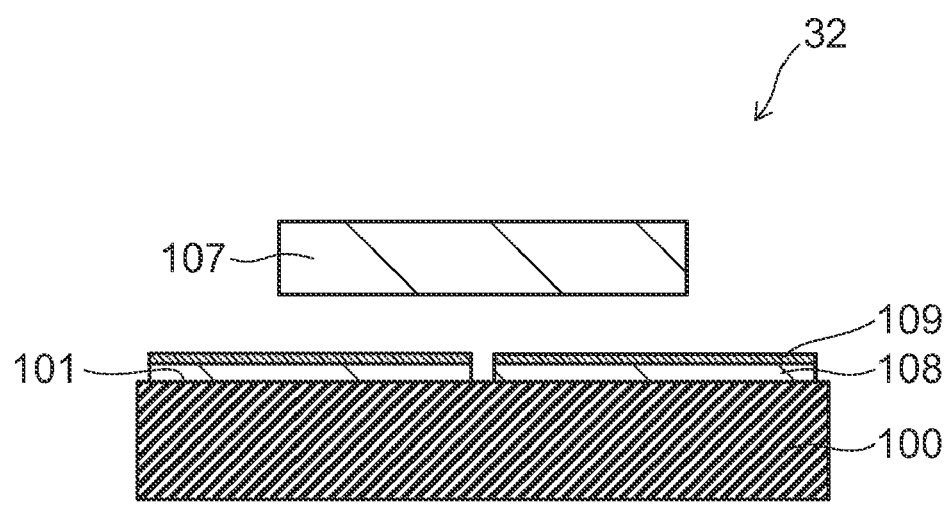
FIG. 13 is a cross-sectional view taken along C-C' line of FIG. 10.
Figure 14:
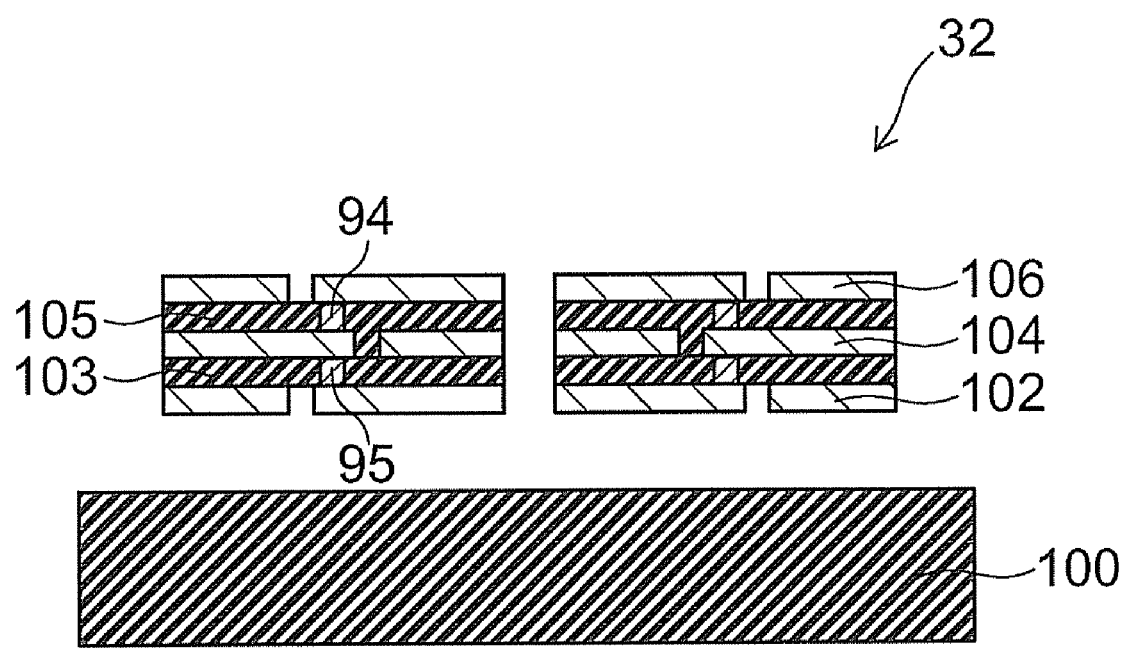
FIG. 14 is a cross-sectional view taken along D-D' line of FIG. 10.

FIG. 11, FIG. 12, FIG. 13, FIG. 14 are a cross-sectional view taken along A-A' line, a cross-sectional view taken along B-B' line, a cross-sectional view taken along C-C' line, a cross-sectional view taken along D-D' line of FIG. 10, respectively. FIG. 13 and FIG. 14 are illustrated with a magnified scale.

Figure 15:
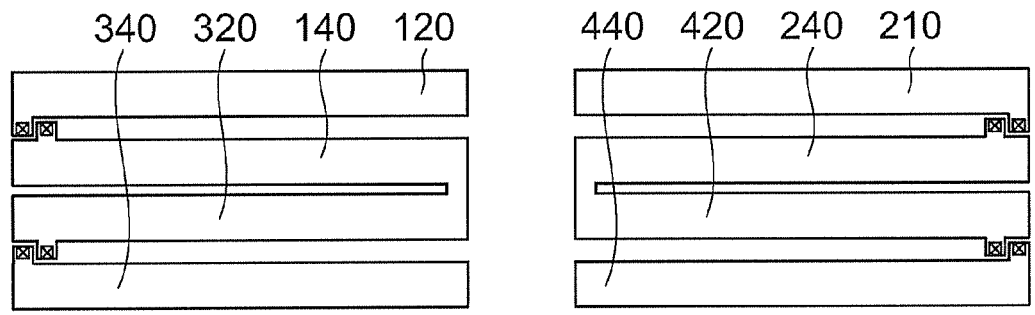
FIG. 15 is a schematic plan view illustrating the structure of an upper electrode of the MEMS variable capacitor.
Figure 16:
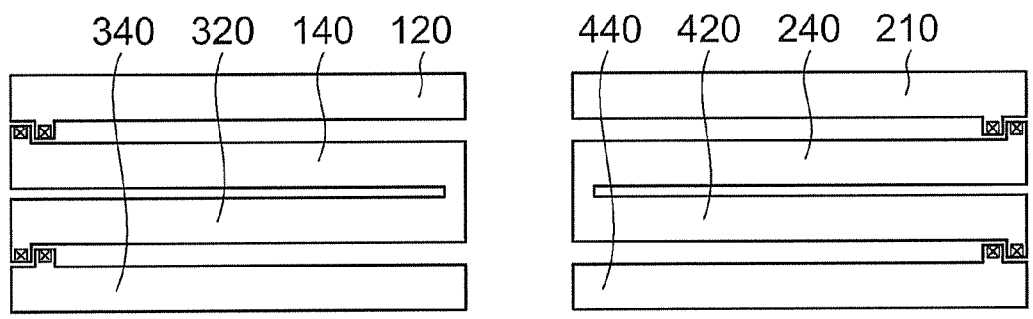
FIG. 16 is a schematic plan view illustrating the structure of an intermediate electrode of the MEMS variable capacitor.
Figure 17:
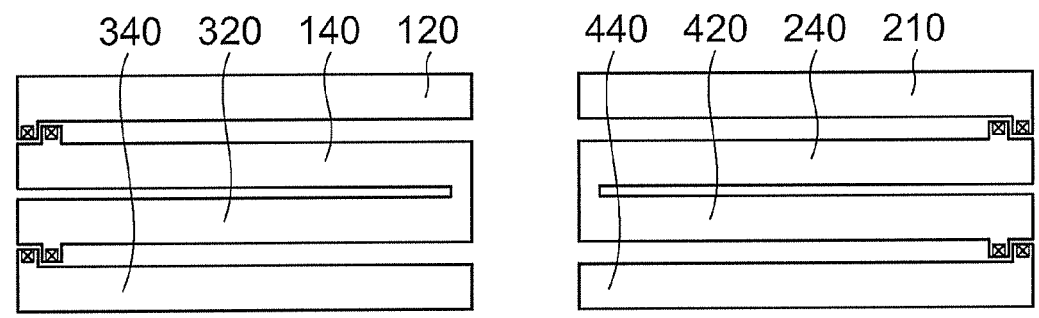
FIG. 17 is a schematic plan view illustrating the structure of a lower electrode of the MEMS variable capacitor.

FIG. 15, FIG. 16, FIG. 17 are schematic plan views illustrating the structure of the upper electrode, intermediate electrode and lower electrode of the MEMS variable capacitor.

As shown in FIG. 10, in the MEMS variable capacitor 32 of the first example, the one end 110a of the first connection beam 110 is a fixed end and fixed to the substrate 100 through the first anchor 115.

Another end of the first connection beam 110 is served as the first connection beam end 110b and connected to the one end 120a of the first actuation beam 120.

Another end of the first actuation beam 120 is served as the connection end 120b and connected to the second connection end 140a serving as one end of the second actuation beam 140 by the first connection portion 130.

Moreover, the another end 140b of the second actuation beam 140 is the first action end 144 and connected to one end of the first weak connection beam 150. Another end of the first weak connection beam 150 is connected to the movable electrode 107.

The first anchor 115, the first connection beam 110 and the first actuation beam 120 described above, and the second actuation beam 140, the first weak connection beam 150 and the movable electrode 107 described above are arrayed generally parallel to the X-axis direction each other and shifted in the Y-axis direction, and have a folded back structure connected each other by the first connection portion 130.

The one end 210a of the second connection beam 210 is a fixed end and fixed to the substrate 100 through the second anchor 215.

Another end of the second connection beam 210 is served as the second connection beam end 210b and connected to the one end 220a of the third actuation beam 220.

Another end of the third actuation beam 220 is served as the third connection end 220b and connected to the fourth connection end 240a serving as one end of the fourth actuation beam 240 by the second connection portion 230.

Moreover, the another end 240b of the fourth actuation beam 240 is the second action end 244 and connected to one end of the second weak connection beam 250. Another end of the second weak connection beam 250 is connected to the movable electrode 107.

The second anchor 215, the second connection beam 210 and the third actuation beam 220 described above, and the fourth actuation beam 240, the second weak connection beam 250 and the movable electrode 107 described above are arrayed generally parallel to the X-axis direction each other and shifted in the Y-axis direction, and have a folded back structure connected each other by the second connection portion 230.

Moreover, the first anchor 115, the first connection beam 110 and the first actuation beam 120, the second anchor 215, the second connection beam 210 and the third actuation beam 220 are aligned in generally the same line in the X-axis direction, the alignment order of the first anchor 115, the first connection beam 110 and the first actuation beam 120 is reverse to the alignment order of the second anchor 215, the second connection beam 210 and the third actuation beam 220.

On the other hand, the second actuation beam 140 and the first weak connection beam 150, and the fourth actuation beam 240 and the second weak connection beam 250 are aligned in generally the same line in the X-axis direction, the alignment order of the second actuation beam 240 and the first weak connection beam 150 is reverse to the alignment order of the fourth actuation beam 240 and the second weak connection beam 250.

Furthermore, the one end 310a of the third connection beam 310 is a fixed end and fixed to the substrate 100 through the third anchor 315.

Another end of the third actuation beam 320 is served as the fifth connection end 310b and connected to the one end 320a of the fifth actuation beam 320.

Another end of the fifth actuation beam 320 is served as the fifth connection end 320b and connected to the sixth connection end 340a serving as one end of the sixth actuation beam 340 by the third connection portion 330.

Moreover, the another end 340b of the sixth actuation beam 340 is the third action end 344 and connected to one end of the third weak connection beam 350. Another end of the third weak connection beam 350 is connected to the movable electrode 107.

The third anchor 315, the third connection beam 310 and the fifth actuation beam 320 described above, and the sixth actuation beam 340, the third weak connection beam 350 and the movable electrode 107 described above are arrayed generally parallel to the X-axis direction and shifted in the Y-axis direction, and have a folded back structure connected each other by the third connection portion 330.

In the above, the third anchor 315, the third connection beam 310 and the fifth actuation beam 320 are arranged at the second actuation beam 140 side of the first connection beam 110 and the first actuation beam 120. And the sixth actuation beam 340 and the third weak connection beam 350 are arranged between the third anchor 315, the third connection beam 310 and the fifth actuation beam 320, and the second actuation beam 140 and the first weak connection beam 150.

Moreover, the first action end 144 and the third action end 344 are connected each other.

Thus, the first anchor 115, the first connection beam 110, the first actuation beam 120, the first connection portion 130, the second actuation beam 140, the first action end 144, the third action end 344, the sixth actuation beam 340, the third connection portion 330, the fifth actuation beam 320, the third connection beam 310 and the third anchor 315 are sequentially connected in this order to form a 'W shape'.

The one end 410a of the fourth connection beam 410 is a fixed end and fixed to the substrate 100 through the fourth anchor 415.

Another end of the fourth connection beam 410 is served as the fourth connection beam end 410b and connected to the one end 420a of the seventh actuation beam 420.

Another end of the seventh actuation beam 420 is served as the seventh connection end 420b and connected to the eighth connection end 440a serving as one end of the eighth actuation beam 440.

Moreover, the another end 440b of the eighth actuation beam 440 is the action end 444 and connected to one end of the fourth weak connection beam 450. Another end of the fourth weak connection beam is connected to the movable electrode 107.

The fourth anchor 415, the fourth connection beam 410 and the seventh actuation beam 420 described above, and the eighth actuation beam 440, the fourth weak connection beam 450 and the movable electrode 107 described above are arrayed generally parallel to the X-axis direction each other and shifted in the Y-axis direction, and have a folded back structure connected each other by the fourth connection portion 430.

Moreover, the third anchor 1315, the third connection beam 310 and the fifth actuation beam 320, the fourth anchor 415, the fourth connection beam 410 and the seventh actuation beam 420 are aligned in generally the same line in the X-axis direction, the alignment order of the third anchor 315, the third connection beam 310 and the fifth actuation beam 320 is reverse to the alignment order of the fourth anchor 415, the fourth connection beam 410 and the seventh actuation beam 420.

On the other hand, the sixth actuation beam 340 and the third weak connection beam 350, and the eighth actuation beam 440 and the fourth weak connection beam 450 are aligned in generally the same line in the X-axis direction, the alignment order of the sixth actuation beam 340 and the third weak connection beam 350 is reverse to the alignment order of the eighth actuation beam 440 and the fourth weak connection beam 450.

In the above, the fourth anchor 415, the fourth connection beam 410 and the seventh actuation beam 420 are arranged at the fourth actuation beam 240 side of the second connection beam 210 and the third actuation beam 220. And the eighth actuation beam 440 and the fourth weak connection beam 450 are arranged between the fourth anchor 415, the fourth connection beam 410 and the seventh actuation beam 420, and the fourth actuation beam 240 and the second weak connection beam 250.

Moreover, the second action end 244 and the fourth action end 444 are connected each other.

Thus, the second anchor 215, the second connection beam 210, the third actuation beam 220, the second connection portion 230, the fourth actuation beam 240, the second action end 244, the fourth action end 444, the eighth actuation beam 440, the fourth connection portion 430, the seventh actuation beam 420, the fourth connection beam 410 and the fourth anchor 415 are sequentially connected in this order to form a 'W shape'.

Moreover, the first to fourth anchors 115, 215, 315, 415 are close inward, the movable electrode 107 is provided therebetween and two groups of shapes in the 'W shape' which is symmetric with respect to a central line passing through the movable electrode 107 are combined.

In the MEMS variable capacitor 32 according to this example, the first to fourth connection beams 110, 210, 310, 410 are based on a substantially flat conductive monolayer. Specifically, a metal monolayer is used.

The movable electrode 107 is also based on a flat conductive monolayer, specifically a metal monolayer, and made of the same metal material as the first to fourth connection beams 110, 210, 310, 410. For example, the movable electrode 107 and the first to fourth connection beams 110, 210, 310, 410 can be based on a monolayer of aluminum.

As described previously, the movable electrode 107 and the first to fourth connection beams 110, 210, 310, 410 can be formed of materials having generally the same thermal expansion coefficient.

The length of the movable electrode 107 in the X-axis direction is designed to be the same as the sum of the length of the first connection beam 110 and the second connection beam 210 in the X-axis direction except a portion of the first connection beam 110 and the second connection beam 210 laminated on the anchor portion.

Moreover, the length of the movable electrode 107 in the X-axis direction is designed to be the same as the sum of the length of the third connection beam 310 and the fourth connection beam 410 in the X-axis direction except a portion of the third connection beam 310 and the fourth connection beam 410 laminated on the anchor portion.

That is, the length in the X-axis direction of the first to fourth connection beams 110, 210, 310, 410 and the length in the X-axis direction of the movable electrode 107 satisfy a relation of $L_e = L_1 + L_2 = L_3 + L_4$.

In addition, the first to fourth weak connection beams 150, 250, 350, and 450 can be formed of materials having generally the same thermal expansion coefficient as the substrate 100.

Moreover, as shown in FIG. 13, two groups of fixed electrodes covered with a dielectric film 109 are placed on a portion of the major surface 101 of the substrate 100 facing the movable electrode 107.

As shown in FIG. 11, the first actuation beam 120 and the third actuation beam 220 have a lower electrode 102, a lower piezoelectric film 103, an intermediate electrode 104, a upper piezoelectric film 105 and an upper electrode 106, and constitute the MEMS variable capacitor to which a piezoelectric actuator designated as the so-called bimorph structure is applied.

Moreover, as shown in FIG. 12, the second actuation beam 140 and the fourth actuation beam 240 also have a lower electrode 102, a lower piezoelectric film 103, an intermediate electrode 104, an upper piezoelectric film 105 and an upper electrode 106.

As shown in FIG. 14, the first to eighth connection ends 120b, 140a, 220b, 240a, 320b, 340a, 420b, 440a are provided with viaholes 94 and 95, and the viahole 94 connects the upper electrode 106 with the intermediate electrode 104 and the viahole 95 connects the intermediate electrode 104 with the lower electrode 102.

Furthermore, as shown in FIGS. 15 to 17, the upper electrode 106, the intermediate electrode 104 and the lower electrode 102 are connected as described below.

The lower electrode 102 of the first actuation beam 120 is connected with the upper electrode 106 of the first actuation beam 120, the intermediate electrode 104 of the second actuation beam 140, the intermediate electrode 104 of the sixth actuation beam 340, the lower electrode 102 of the fifth actuation beam 320 and the upper electrode 106 of the fifth actuation beam 320.

The intermediate electrode 104 of the first actuation beam 120 is connected with the lower electrode 102 of the second actuation beam 140, the upper electrode 106 of the second actuation beam 140, the lower electrode 102 of the sixth actuation beam 340, the upper electrode 106 of the sixth actuation beam 340 and the intermediate electrode 104 of the fifth actuation beam 320.

As shown in FIG. 11, the lower electrode 102 of the first actuation beam 120 is connected to the first anchor 115 through the first connection beam 110. Moreover, it is not shown in a drawing, but the intermediate electrode 104 of the fifth actuation beam 320 is connected to the third anchor 315 through the third connection beam 310.

Thus, by application of actuation voltage between the first anchor 115 and the third anchor 315, a bending in the reverse direction due to an electrostriction effect is generated on the first and fifth actuation beams 120, 320 and the second and sixth actuation beams 140, 340 having the 'W shape', and displacement can be produced on the first action end 144 and the third action end 344.

Also with regard to the third, the fourth, the seventh, the eighth actuation beams 220, 240, 420, 440, a bending similar to the first, the second, the fifth, the sixth actuation beams 120, 140, 320, 340 is generated, and similar displacement can be produced on the second action end 244 and the fourth action end 444.

With regard to the MEMS variable capacitor 32 according to this example, behavior of the case where asymmetric residual stress about up and down is generated during film formation will be described. When the asymmetric residual stress about up and down is generated, a warp is generated in accordance with magnitude of the residual stress on the first to eighth actuation beams 120, 140, 220, 240, 320, 340, 420, 440. However, the warp of the first actuation beam 120 and the warp of the second actuation beam 140 are canceled out and similarly the warps of the third and fourth, the fifth and sixth, and the seventh and eighth actuation beams are canceled out, and consequently, a height of the lower surface of the movable electrode 107 is generally the same as a height of the upper surface of the first to fourth anchors 115, 215, 315, 415. That is, the warp of the movable electrode 107 is suppressed and substantially parallel to the fixed electrode 108.

Moreover, the metal monolayer is used for the movable electrode 107, thus the warp due to the residual stress is not generated on the movable electrode 107.

As described above, regardless of the magnitude of the residual stress by the film formation, the first to fourth action ends 144, 244, 344, 444 are displaced in accordance with actuation voltage, hence the movable electrode 107 made of the metal monolayer connected through the first to fourth weak connection beams 150, 250, 350, 450 moves with great stability parallel to the perpendicular direction to the major surface of the substrate, and can make contact with the fixed electrode with flatness through the dielectric film 109.

Furthermore, with regard to the MEMS variable capacitor 32 according to this example, behavior of the case where a temperature change occurs will be described.

First, the temperature change causes variation of the length and the warp of the first to eighth actuation beams 120, 140, 220, 240, 320, 340, 420, 440. However, as is the case with the residual stress, the warp of the first actuation beam 120 and the length variation and the warp of the second actuation beam 140 are canceled out, and similarly the length variation and the warp of the third and fourth, the fifth and sixth, the seventh and eighth actuation beams are canceled out, and consequently positions of the first to fourth action ends 144, 244, 344, 444 are kept generally constant.

Moreover, the temperature change causes the lengths of the first to fourth connection beams 110, 210, 310, 410 and the movable electrode 107 due to the thermal expansion. However, the sum of the length of the first connection beam 110 and the second connection beam 210 except the portion on the anchor, the sum of the length of the third connection beam 310 and the fourth connection beam 410 except the portion on the anchor and the length of the movable electrode 107 are equal and materials thereof are the same, hence the length variations due to the thermal expansion are canceled out. Moreover, the thermal expansion is caused also on the weak connection beams 150, 250, 350, 450, but selecting these thermal expansion coefficients so as to be the same as or generally equal to the thermal expansion coefficient of the substrate 100 enables the thermal expansion of portions of the first to fourth weak connection beams 150, 250, 350, 450 to have no influence on the variable capacitor.

Thus, even if the temperature change occurs, by canceling out the thermal expansion strain of respective members with finesse, the position of the movable electrode 107 is always kept constant.

As described above, in the MEMS variable capacitor 32 according to this example, regardless of the magnitude of the residual stress by the film formation and the temperature change, the movable electrode 107 is always kept flat and parallel to the fixed electrode 108 at the constant position, and bringing the movable electrode into intimate contact with the fixed electrode 108 through the dielectric film 109 by application of the actuation voltage gives a large maximum capacity and allows the variable capacitor having an extremely large variable capacity ratio to be achieved.

Next, a method for manufacturing the MEMS variable capacitor 32 according to this example will be described.

FIGS. 18A to 18C are schematic cross-sectional views in process order illustrating a method for manufacturing the MEMS variable capacitor according to the first example of the invention.

That is, FIG. 18A corresponds to the first process, FIG. 18B follows FIG. 18A and FIG. 18C follows FIG. 18B.

FIGS. 19A and 19B are schematic cross-sectional views in process order following FIGS. 18A to 18C.

These drawings are schematic cross-sectional views corresponding to cross-section taken along A-A' line in FIG. 10.

First, as shown in FIG. 18A, the fixed electrode 108 covered with the dielectric film 109 and the first, second anchors 115, 215 (and the third, fourth anchors 315, 415 not shown) are formed on the silicon (Si) substrate 100 having the insulative surface. The fixed electrode 108 can be based on aluminum (Al) fabricated by a sputtering method, the dielectric film 109 can be based on aluminum nitride (AlN) fabricated by a sputtering method, and the first, second anchors 115, 215 can be based on a silicon nitride film fabricated by a LP-CVD (Low Pressure Chemical Vapor Deposition) method. Methods such as a lithography and a reactive ion etching can be used for a process.

Next, as shown in FIG. 18B, a sacrifice layer 100a is formed on the surface of the substrate 100, and surface polishing and planarization are performed until the first, second anchors 115, 215 are exposed using CMP (Chemical Mechanical Polishing) technique. The sacrifice layer 100a can be based on inorganic materials, metal materials, organic materials allowing selective etching to other film materials, but in this example polysilicon is used.

Next, as shown in FIG. 18C, the first actuation beam 120 and the third actuation beam 220 having a piezoelectric bimorph actuator composed of the lower electrode 102, the lower piezoelectric film, the intermediate electrode 104, the upper piezoelectric film 105 and the upper electrode 106 are formed. The lower, intermediate, upper electrodes 102, 104, 106 are based on aluminum (Al) with a thickness of 200 nm, the lower, upper piezoelectric films 103, 105 are based on aluminum nitride (AlN) with a thickness of 500 nm. All of them are fabricated by sputtering and patterned by lithography and etching.

The first to fourth weak connection beams 150, 250, 350, 450 are fabricated simultaneously with the lower piezoelectric film 103, and not shown.

Next, as shown in FIG. 19A, the first, second connection beams 110, 210 made of aluminum (Al) are fabricated by the sputtering method. The lithography and the reactive ion etching are used for a process.

As not shown in the view, the movable electrode 107 is fabricated simultaneously with the third, fourth connection beams 310, 410.

Next, as shown in FIG. 19B, the sacrifice layer 100a is removed by the selective etching using $XeF_2$ as an etching gas.

As described above, the MEMS variable capacitor 32 of this example illustrated in FIG. 10 to FIG. 17 is fabricated.

Simulation results about the characteristics of the MEMS variable capacitor 32 according to this example having this kind of structure will be described.

Figure 20:
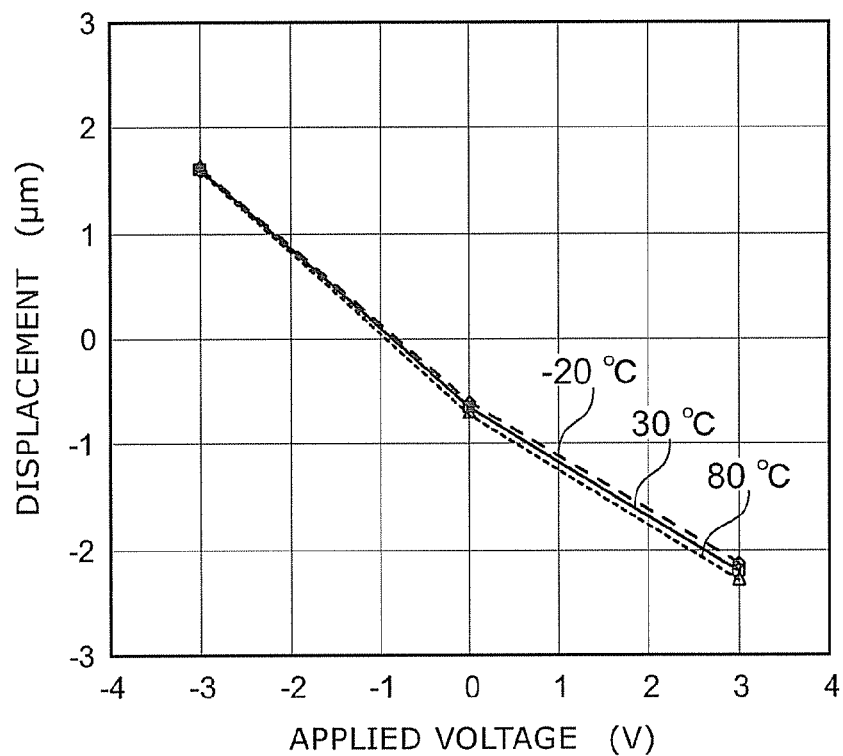
FIG. 20 is a graph view illustrating the characteristics of the MEMS variable capacitor according to the first example of the invention.

FIG. 20 is a graph view illustrating the characteristics of the MEMS variable capacitor according to the first example of the invention.

In the view, the horizontal axis represents applied voltage between the intermediate electrode 104 and the upper electrode 106 and the lower electrode 102, and the vertical axis represents the displacement of the movable electrode 107. The view illustrates results of the displacement at three temperatures of −20° C., +30° C. and +80° C.

The graph illustrates the characteristic of the height variation of the movable electrode 107 in the MEMS variable capacitor 32 in the case where the actuation voltage of −3V to +3V is applied at the temperature of −20° C. to 80° C. The first to eighth actuation beams 120, 140, 220, 240, 320, 340, 420, 440 have a length of 400 μm and a width of 80 μm, and both a length and a width of the movable electrode 107 are 120 μm. A difference of the residual stress between the upper piezoelectric film 105 and the lower piezoelectric film 103 of respective actuation beams suffering upward warping is about 200 MPa.

As shown in FIG. 20, in the MEMS variable capacitor 32 according to this example, even if the temperature changes from −20° C. to 80° C., the height variation of the movable electrode 107 is very small to be 0.2 μm or less, and stable operation can be confirmed in spite of the temperature change.

Third Comparative Example

A MEMS variable capacitor 93 of a third comparative example is a MEMS variable capacitor in which the first to fourth connection beams 110, 210, 310, 410 are not fabricated and the first, third, fifth, seventh actuation beams 120, 220, 320, 420 are directly connected to the first to fourth anchors 115, 215, 315, 415 with respect to the MEMS variable capacitor of the first example. All other than this is the same as the MEMS variable capacitor 32, hence not described.

Figure 21:
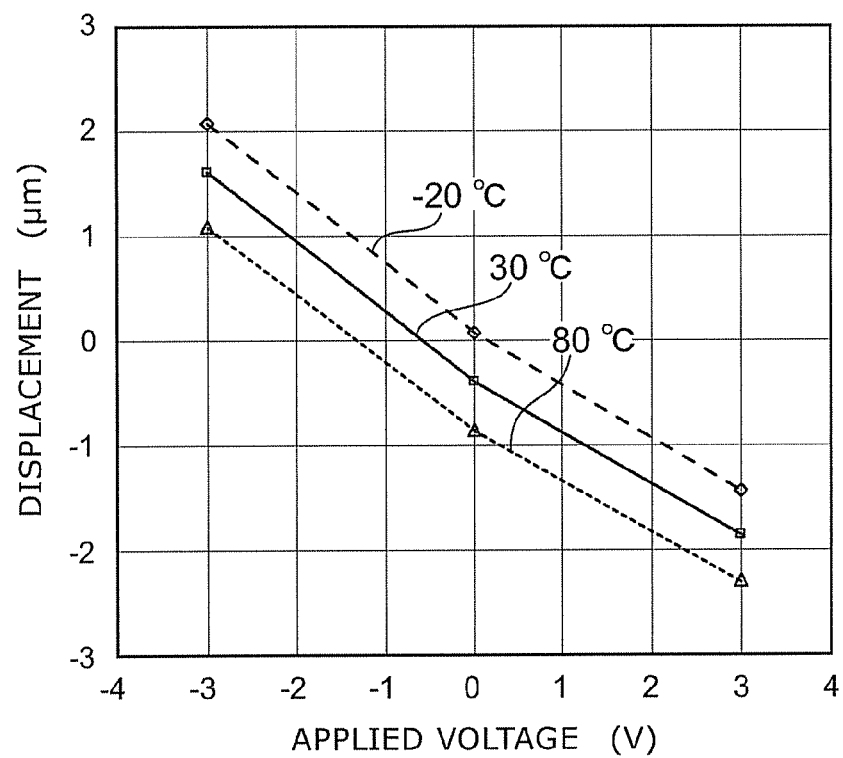
FIG. 21 is a graph view illustrating the characteristics of a MEMS variable capacitor according to a third comparative example.

FIG. 21 is a graph view illustrating the characteristics of a MEMS variable capacitor according to a third comparative example.

That is, the graph illustrates the characteristic of the height variation of the movable electrode 107 in the MEMS variable capacitor 93 of the third comparative example in the case where the actuation voltage of −3V to +3V is applied at the temperature of −20° C. to 80° C.

As shown in FIG. 21, comparing cases at −20° C. and 80° C., the height of the movable electrode 107 displaces by about 1 μm. The displacement corresponds to 1.5 v or more in the conversion to applied voltage, and it is evident that the operation is unstable on the temperature fluctuation.

On the contrary, as described previously, in the MEMS variable capacitor 32 according to the first example, even if the temperature changes from −20° C. to 80° C., the height variation of the movable electrode 107 is very small to be 0.2 µm or less, and the operation is stable in spite of the temperature change, hence the MEMS variable capacitor can be provided, which brings the movable electrode into stable contact with the fixed electrode in a wide temperature range, and having a large maximum capacity value with excellent reproducibility and reliability.

Second Example

Figure 22:
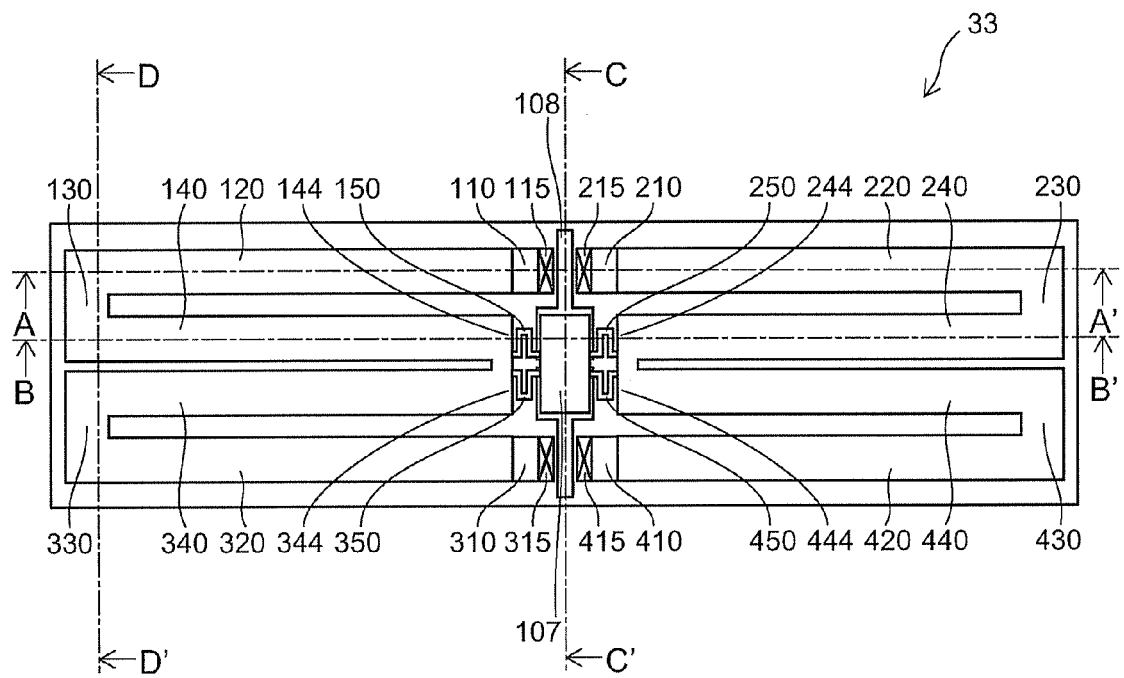
FIG. 22 is a schematic plan view illustrating the configuration of a MEMS variable capacitor according to a second example of the invention.

FIG. 22 is a schematic plan view illustrating the configuration of a MEMS variable capacitor according to a second example of the invention.

Figure 23:
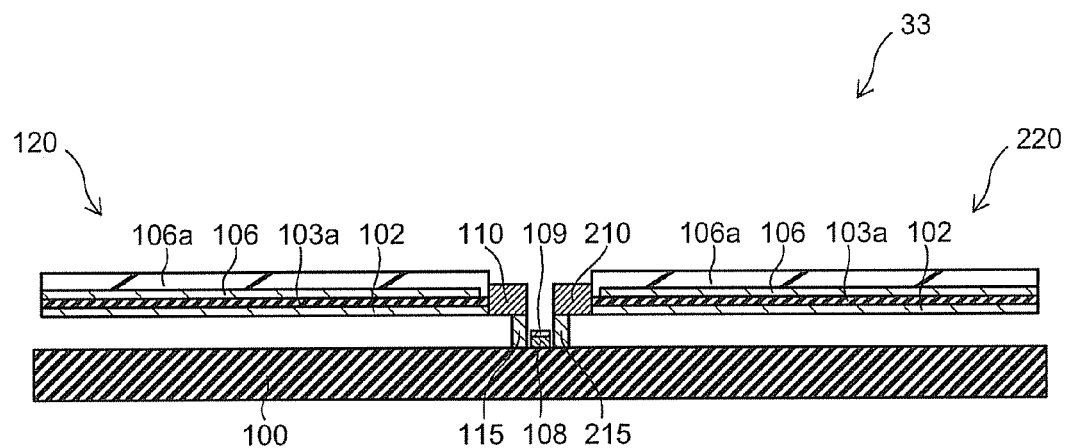
FIG. 23 is a cross-sectional view taken along A-A' line of FIG. 22.

FIG. 23 is a cross-sectional view taken along A-A' line of FIG. 22.

As shown in FIG. 22, the MEMS variable capacitor 33 according to the second example of the invention has the same plan structure as the first example. However, it is different in that the first to eighth actuation beams are based on a piezoelectric unimorph structure in stead of the piezoelectric bimorph structure.

That is, as shown in FIG. 23, in the MEMS variable capacitor 33, the first actuation beam 120 and the third actuation beam 220 have the lower electrode 102, a piezoelectric film 103a and the upper electrode 106, and this specific example is a MEMS variable capacitor based on the unimorph structure piezoelectric actuator. As not shown, the second, the fourth to eighth actuation beams 140, 240, 320, 340, 420, 440 also have the unimorph structure including the lower electrode 102, the piezoelectric film 103a and the upper electrode 106. The support film 106a is provided on the upper electrode 106.

Also in the MEMS variable capacitor 33 according to this example, the MEMS variable capacitor can be provided, which brings the movable electrode into stable contact with the fixed electrode in a wide temperature range, and having a large maximum capacity value with excellent reproducibility and reliability.

Comparing the MEMS variable capacitor 32 according to the first example and the MEMS variable capacitor 33 according to the second example, the unimorph type MEMS variable capacitor 33 has an advantage that a small number of laminated layer is only needed, although the amount of displacement of the movable electrode 107 is reduced to half in the comparison with the bimorph type MEMS variable capacitor 32.

Fourth Embodiment

Figure 24:
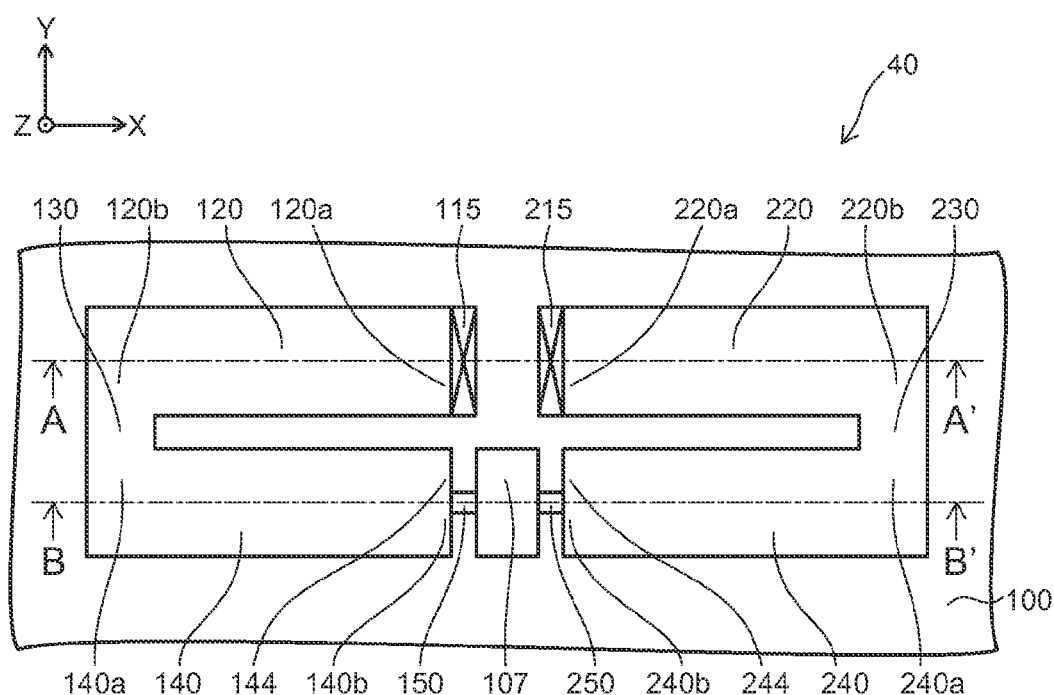
FIG. 24 is a schematic plan view illustrating the configuration of a MEMS variable capacitor according to a fourth embodiment of the invention.

FIG. 24 is a schematic plan view illustrating the configuration of a MEMS variable capacitor according to a fourth embodiment of the invention.

As shown in FIG. 24, the MEMS variable capacitor 40 according to this embodiment has not the first connection beam 110 and the second connection beam 210, however the thermal expansion coefficient of the movable electrode 107 is set to be the same as the thermal expansion coefficient of the substrate 100.

That is, a difference of the thermal expansion coefficient between the movable electrode 107 and the substrate 100 is set to be 100 ppm/° C. or less, preferably 5 ppm/° C. or less.

Hence, in the MEMS variable capacitor 40, also in the case of the temperature change, the dimension variation of the substrate 100 due to thermal expansion or thermal contraction concurs with the dimension variation of the movable electrode 107 due to thermal expansion or thermal contraction, therefore strain of the first to fourth actuation beams 120, 140, 220, 240 is generated with difficulty, also in the case of the temperature change in a wide temperature range, the distance between the movable electrode 107 and the substrate 100 is kept in parallel, and the displacement of the movable electrode 107 to the fixed electrode 108 does not change. As a result, the variable capacitor having a large maximum capacity value with excellent reproducibility and reliability can be provided.

In this case, the movable electrode 107 can be based on a monolayer body. For example, when a laminated film is used for the movable electrode 107, in the case where the temperature of the MEMS variable capacitor is changed by the difference of the thermal expansion coefficients of materials constituting the laminated film, the laminated film occasionally suffers warping or the like, however use of the monolayer body for the movable electrode 107 can suppress the warp, and it is further preferable.

Furthermore, the movable electrode 107 can be based on substantially the flat conductive monolayer, for example, based on metal material of the monolayer. Hence, the movable electrode 107 can be provided with conductivity and capacitance between the fixed electrode 108 and the movable electrode 107 can be formed.

In the above, the movable electrode 107 may behave as the monolayer body with respect to the temperature change and, for example, it is only desirable that an extremely thin another material is laminated on the monolayer material and hence the warp is not generated practically in spite of the temperature change.

However, when the movable electrode 107 is based on the laminated film, the thermal expansion coefficient of the whole laminated film can be set to be equal to the thermal expansion coefficient of the substrate 100.

Figure 25A:
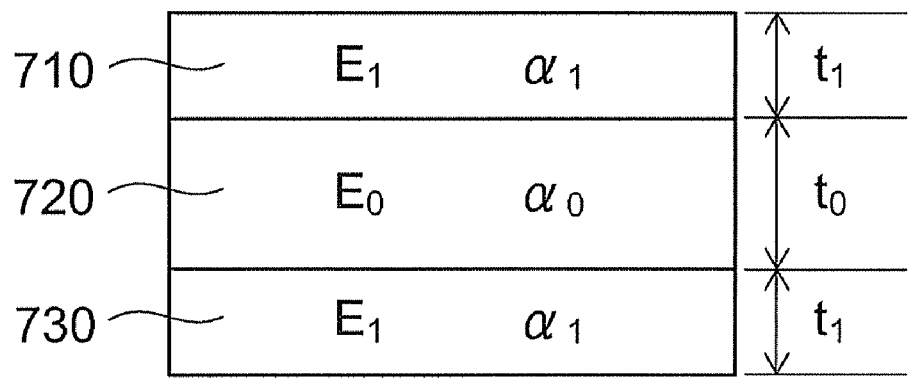
FIGS. 25A and 25B are schematic cross-sectional views illustrating a laminated structure body which can be used for the MEMS variable capacitor according to the fourth embodiment of the invention.
Figure 25B:
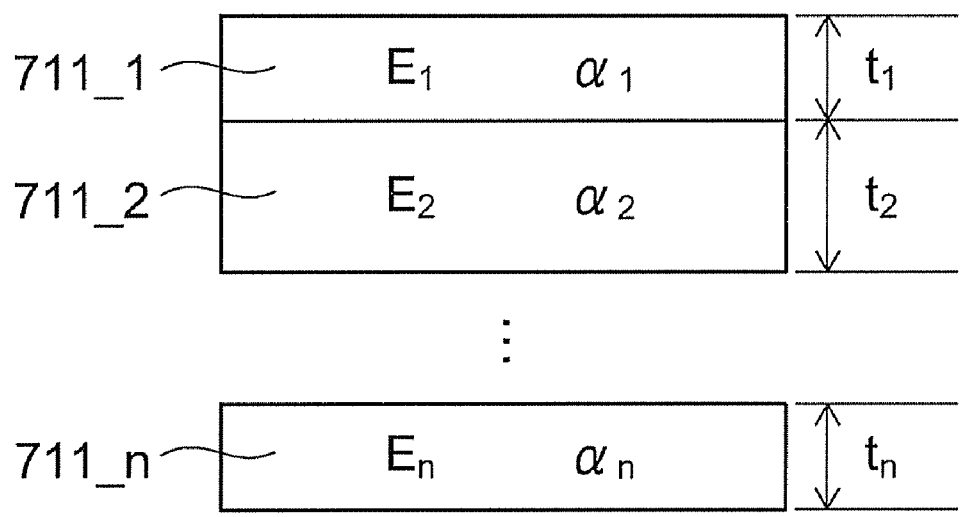

FIGS. 25A and 25B are schematic cross-sectional views illustrating a laminated structure body which can be used for the MEMS variable capacitor according to the fourth embodiment of the invention.

That is, FIGS. 25A and 25B show two examples using the laminated structure body instead of the monolayer body for the first connection beam 110, the second connection beam 210 and the movable electrode 107.

As shown in FIG. 25A, the movable electrode 105 can be based on the laminated structure body of three layers made of a first layer 710, a second layer 720 and a third layer 730. At this time, it is preferable that the first layer 710 and the third layer 730 sandwiching the second layer 720 in a vertical direction are based on the same material having the same thickness in order to eliminate the warp due to the thermal expansion difference to the temperature change.

Here, assuming that each longitudinal elastic coefficient (Young's modulus) of the first layer 710, the second layer 720 and the third layer 730 is $E_1$, $E_0$, $E_1$, each thickness is $t_1$, $t_0$, $t_1$, and each thermal expansion coefficient is $\alpha_1$, $\alpha_0$, $\alpha_1$, a thermal expansion coefficient $\alpha$ of the laminated structure body made of the first layer 710, the second layer 720, the third layer 730 is expressed by the following equation 1.

$$\alpha = (2E_1 t_1 \alpha_1 + E_0 t_0 \alpha_0)/(2E_1 t_1 + E_0 t_0) \quad (1)$$

That is, it is only desirable that the difference between the thermal expansion coefficient $\alpha$ expressed by the equation 1 and a thermal expansion coefficient $\alpha_s$ of the substrate 100 is 10 ppm/° C. or less, preferably 5 ppm/° C. or less.

Furthermore, as shown in FIG. 25B, assuming that the movable electrode 107 is made of the laminated film of n (n is an integer of 1 or more) layers, a longitudinal elastic coefficient (Young's modulus) of i-th laminated film 711_$i$ is $E_i$, a thickness is $t_i$, and a thermal expansion coefficient is $\alpha_i$, a thermal expansion coefficient $\alpha$ of the laminated structure body of n layers is expressed by the following equation 2.

$$a = \left[\sum_{i=1}^{n} E_i t_i a_i\right] / \left[\sum_{i=1}^{n} E_i t_i\right] \quad (2)$$

That is, it is only desirable that the difference between the thermal expansion coefficient $\alpha$ expressed by the equation 2 and the thermal expansion coefficient $\alpha_s$ of the substrate 100 is 10 ppm/° C. or less, preferably 5 ppm/° C. or less.

Also in this case, it is preferable that vertically symmetrical positions of respective laminated films in an outward direction from a thickness center of the laminated structure body are based on the same material having the same thickness in order to eliminate the warp due to the thermal expansion difference to the temperature change.

According to the MEMS variable capacitor 40 according to this embodiment, the MEMS variable capacitor can be provided, which brings the movable electrode into stable contact with the fixed electrode in a wide temperature range, and having a large maximum capacity value with excellent reproducibility and reliability.

Also in this case, the bimorph type and the unimorph type actuation beams can be used.

Fifth Embodiment

Figure 26:
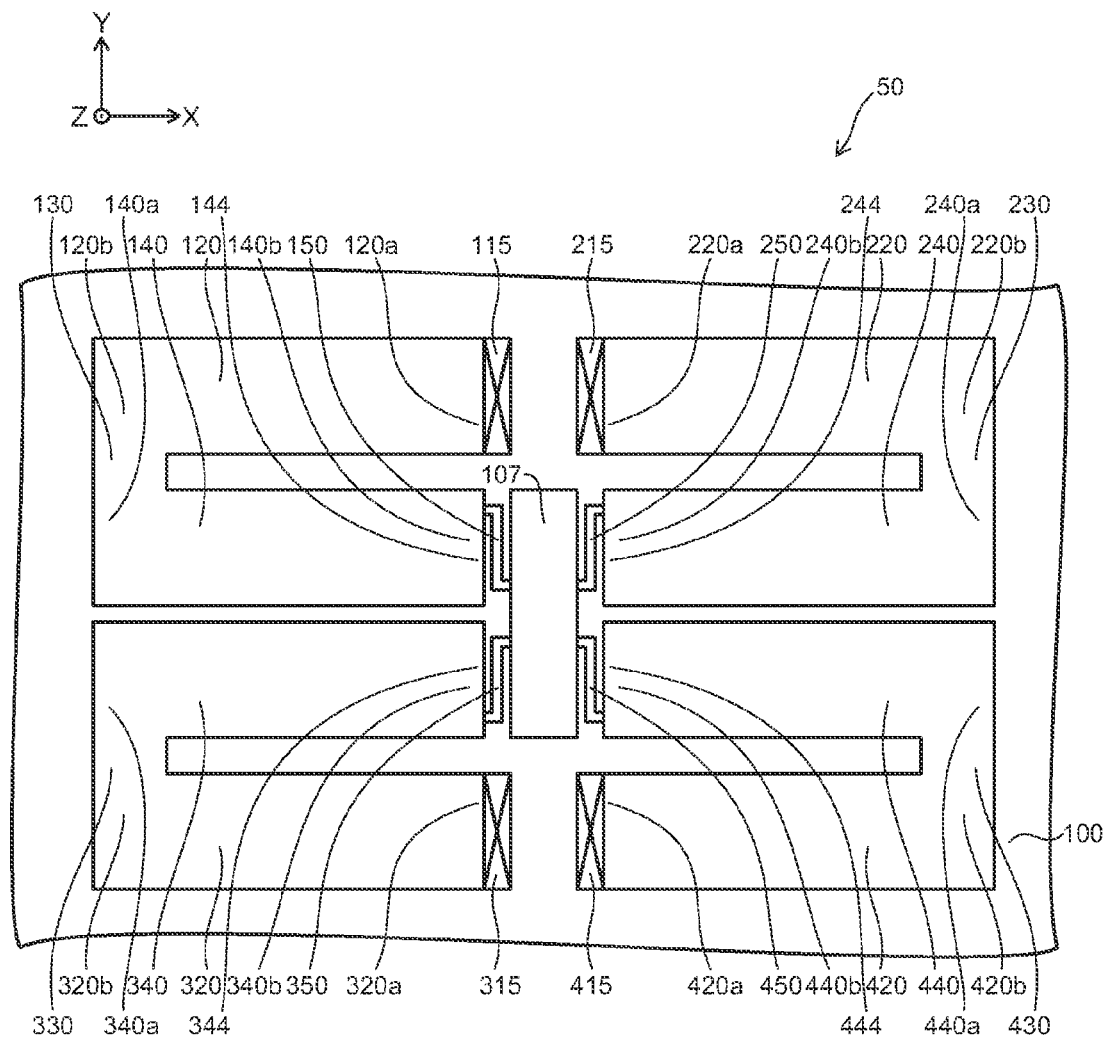
FIG. 26 is a schematic plan view illustrating the configuration of a MEMS variable capacitor according to a fifth embodiment of the invention.

FIG. 26 is a schematic plan view illustrating the configuration of a MEMS variable capacitor according to a fifth embodiment of the invention.

As shown in FIG. 26, the MEMS variable capacitor 50 according to the fifth embodiment of the invention has a feature combining two 'W shape' which combines two MEMS variable capacitors 40 according to the forth embodiment.

That is, the MEMS variable capacitor 50 according to the fifth embodiment includes the following in addition to the MEMS variable capacitor according to the fourth embodiment.

The MEMS variable capacitor 50 further includes: the fifth actuation beam 320 having the one end 320a fixed to the substrate 100, the another end served as the fifth connection end 320b, and the piezoelectric film sandwiched between the lower electrode and the upper electrode; and the sixth actuation beam 340 having the one end served as the sixth connection end 340a connected to the fifth connection end 320b, extending from the sixth connection end 340a in the parallel and reverse direction to the fifth actuation beam 320, and having the another end 340b served as the third action end 344 and the piezoelectric film sandwiched between the lower electrode and the upper electrode.

Moreover, the MEMS variable capacitor 50 further includes: the seventh actuation beam 420 having the one end 420a fixed to the substrate 100, the another end served as the seventh connection end 420b and the piezoelectric film sandwiched between the lower electrode and the upper electrode; and the eighth actuation beam 440 having the one end served as the eighth connection end 440a connected to the seventh connection end 420b, extending from the eighth connection end 440a in the parallel and reverse direction to the seventh actuation beam 420, and having the another end 440b served as the fourth action end 444 and the piezoelectric film sandwiched between the lower electrode and the upper electrode.

Moreover, the movable electrode 107 is provided between the third action end 344 and the fourth action end 444.

The fifth and seventh actuation beams 320, 420 are placed on a line, and the sixth and eighth actuation beams 340, 440 are placed on a line.

Furthermore, the fifth and sixth actuation beams 320, 340 and the seventh and eighth actuation beams 420, 440 are placed symmetrically about a line.

Also in this case, the thermal expansion coefficient of the movable electrode 107 is set to be the same as the thermal expansion coefficient of the substrate 100.

The MEMS variable capacitor 50 according to this embodiment having this kind of configuration enables the strain stress in the Y-axis direction to be further compensated with respect to the MEMS variable capacitor 40, and the distance between the movable electrode 107 and the fixed electrode 108 to be kept parallel with more stability.

As described above, according to the MEMS variable capacitor 50 according to this embodiment, the MEMS variable capacitor can be provided, which brings the movable electrode 107 into stable contact with the fixed electrode 108 in a wide temperature range, and having a large maximum capacity value with excellent reproducibility and reliability.

Also in this case, the bimorph type and the unimorph type actuation beams can be used.

Furthermore, the MEMS variable capacitors according to respective embodiments described above can be used as a radio-frequency capable capacitor switch.

The embodiment of the invention has been described with reference to the examples. However, the invention is not limited to these examples. For example, the specific configurations of respective elements constituting the MEMS variable capacitor that is suitably selected from the publicly known ones by those skilled in the art is encompassed within the scope of the invention as long as the configurations can implement the invention similarly and achieve the same effects. Moreover, elements in two or more of the specific examples can be combined with each other as long as technically feasible, and such combinations are also encompassed within the scope of the invention as long as they fall within the spirit of the invention.

The MEMS variable capacitors described above as the embodiment of the invention can be suitably modified and practiced by those skilled in the art, and such modifications are also encompassed within the scope of the invention as long as they fall within the spirit of the invention.

Various other variations and modifications can be conceived by those skilled in the art within the spirit of the invention, and it is understood that such variations and modifications are encompassed within the scope of the invention.

The invention claimed is:

1. A MEMS variable capacitor comprising:
a first connection beam having one end fixed to a substrate and another end served as a connection beam end;
a first actuation beam having one end connected to the first connection beam end, another end served as a first connection end and a first piezoelectric film sandwiched between a first lower electrode and a first upper electrode;
a second actuation beam having one end served as a second connection end connected to the first connection end, extending from the second connection end in a parallel and reverse direction to the first actuation beam, and having another end served as a first action end and a second piezoelectric film sandwiched between a second lower electrode and a second upper electrode;

a second connection beam having one end fixed to the substrate and another end served as a second connection beam end;

a third actuation beam having one end connected to the second connection beam end, another end served as a third connection end and a third piezoelectric film sandwiched between a third lower electrode and a third upper electrode;

a fourth actuation beam having one end served as a fourth connection end connected to the third connection end, extending from the fourth connection end in a parallel and reverse direction to the third actuation beam, having another end served as a second action end and a fourth piezoelectric film sandwiched between a forth lower electrode and a fourth upper electrode;

a movable electrode provided between the first action end and the second action end;

a fixed electrode provided on the substrate opposed to the movable electrode;

a third connection beam having one end fixed to the substrate and another end served as a third connection beam end;

a fifth actuation beam having one end connected to the third connection beam end, another end served as a fifth connection end and a fifth piezoelectric film sandwiched between a fifth lower electrode and a fifth upper electrode;

a sixth actuation beam having one end served as a sixth connection end connected to the fifth connection end, extending from the sixth connection end in a parallel and reverse direction to the fifth actuation beam, and having another end served as a third action end and a sixth piezoelectric film sandwiched between a sixth lower electrode and a sixth upper electrode;

a fourth connection beam having one end fixed to the substrate and another end served as a fourth connection beam connected to a fourth connection beam end;

a seventh actuation beam having one end connected to the fourth connection beam end, another end served as a seventh connection end and a seventh piezoelectric film sandwiched between a seventh lower electrode and a seventh upper electrode; and an eighth actuation beam having one end served as an eighth connection end connected to the seventh connection end, extending from the eighth connection end in a parallel and reverse direction to the seventh actuation beam, and having another end served as a fourth action end and an eighth piezoelectric film sandwiched between an eighth lower electrode and an eighth upper electrode, the movable electrode being provided between the third action end and the fourth action end, the first and third actuation beams being placed on a first line, the second and fourth actuation beams being placed on a second line, the first and second actuation beams and the third and fourth actuation beams being placed symmetrically about a third line, the fifth and seventh actuation beams being placed on a fourth line, the sixth and eighth actuation beams being placed on a fifth line, and the fifth and sixth actuation beams and the seventh and eighth actuation beams being placed symmetrically about the third line, and the first, second, third, fourth connection beams, and the movable electrode being made of a conductive monolayer.

2. The capacitor according to claim 1, wherein a sum of lengths of the first and second connection beams and a sum of lengths of the third and fourth connection beams are equal to a length of the movable electrode, respectively.

3. A MEMS variable capacitor comprising:

a first connection beam having one end fixed to a substrate and another end served as a connection beam end;

a first actuation beam having one end connected to the first connection beam end, another end served as a first connection end and a first piezoelectric film sandwiched between a first lower electrode and a first upper electrode;

a second actuation beam having one end served as a second connection end connected to the first connection end, extending from the second connection end in a parallel and reverse direction to the first actuation beam, and having another end served as a first action end and a second piezoelectric film sandwiched between a second lower electrode and a second upper electrode;

a second connection beam having one end fixed to the substrate and another end served as a second connection beam end;

a third actuation beam having one end connected to the second connection beam end, another end served as a third connection end and a third piezoelectric film sandwiched between a third lower electrode and a third upper electrode;

a fourth actuation beam having one end served as a fourth connection end connected to the third connection end, extending from the fourth connection end in a parallel and reverse direction to the third actuation beam, having another end served as a second action end and a fourth piezoelectric film sandwiched between a forth lower electrode and an a fourth upper electrode;

a movable electrode provided between the first action end and the second action end;

a fixed electrode provided on the substrate opposed to the movable electrode;

a third connection beam having one end fixed to the substrate and another end served as a third connection beam end;

a fifth actuation beam having one end connected to the third connection beam end, another end served as a fifth connection end and a fifth piezoelectric film sandwiched between a fifth lower electrode and a fifth upper electrode;

a sixth actuation beam having one end served as a sixth connection end connected to the fifth connection end, extending from the sixth connection end in a parallel and reverse direction to the fifth actuation beam, and having another end served as a third action end and a sixth piezoelectric film sandwiched between a sixth lower electrode and a sixth upper electrode;

a fourth connection beam having one end fixed to the substrate and another end served as a fourth connection beam connected to a fourth connection beam end;

a seventh actuation beam having one end connected to the fourth connection beam end, another end served as a seventh connection end and a seventh piezoelectric film sandwiched between a seventh lower electrode and a seventh upper electrode; and an eighth actuation beam having one end served as an eighth connection end connected to the seventh connection end, extending from the eighth connection end in a parallel and reverse direction to the seventh actuation beam, and having another end served as a fourth action end and an eighth piezoelectric film sandwiched between an eighth lower electrode and an eighth upper electrode, the movable electrode being provided between the third action end and the fourth action end, the first and third actuation beams being placed on a first line, the second and fourth actuation beams being placed on a second line, the first and second actuation beams and the third and fourth actuation beams being placed symmetrically about a third line, the fifth and seventh actuation beams being placed on a fourth line, the sixth and eighth actuation beams being placed on a fifth line, the fifth and sixth actuation beams and the seventh and eighth actuation beams being placed symmetrically about the third line, and the first connection beam including a first slit extending a direction parallel to the first line, the second connection beam including a second slit extending a direction parallel to the second line, the third connection beam including a third slit extending a direction parallel to the first line, the fourth connection beam including a fourth slit extending a direction parallel to the second line.

4. The capacitor according to claim 3, wherein a sum of lengths of the first and second connection beams and a sum of lengths of the third and fourth connection beams are equal to a length of the movable electrode, respectively.

5. A MEMS variable capacitor comprising:

a first connection beam having one end fixed to a substrate and another end served as a connection beam end;

a first actuation beam having one end connected to the first connection beam end, another end served as a first connection end and a first piezoelectric film sandwiched between a first lower electrode and a first upper electrode;

a second actuation beam having one end served as a second connection end connected to the first connection end, extending from the second connection end in a parallel and reverse direction to the first actuation beam, and having another end served as a first action end and a second piezoelectric film sandwiched between a second lower electrode and a second upper electrode;

a second connection beam having one end fixed to the substrate and another end served as a second connection beam end;

a third actuation beam having one end connected to the second connection beam end, another end served as a third connection end and a third piezoelectric film sandwiched between a third lower electrode and a third upper electrode;

a fourth actuation beam having one end served as a fourth connection end connected to the third connection end, extending from the fourth connection end in a parallel and reverse direction to the third actuation beam, having another end served as a second action end and a fourth piezoelectric film sandwiched between a forth lower electrode and an a fourth upper electrode;

a movable electrode provided between the first action end and the second action end;

a fixed electrode provided on the substrate opposed to the movable electrode;

a third connection beam having one end fixed to the substrate and another end served as a third connection beam end;

a fifth actuation beam having one end connected to the third connection beam end, another end served as a fifth connection end and a fifth piezoelectric film sandwiched between a fifth lower electrode and a fifth upper electrode;

a sixth actuation beam having one end served as a sixth connection end connected to the fifth connection end, extending from the sixth connection end in a parallel and reverse direction to the fifth actuation beam, and having another end served as a third action end and a sixth piezoelectric film sandwiched between a sixth lower electrode and a sixth upper electrode;

a fourth connection beam having one end fixed to the substrate and another end served as a fourth connection beam connected to a fourth connection beam end;

a seventh actuation beam having one end connected to the fourth connection beam end, another end served as a seventh connection end and a seventh piezoelectric film sandwiched between a seventh lower electrode and a seventh upper electrode;

an eighth actuation beam having one end served as an eighth connection end connected to the seventh connection end, extending from the eighth connection end in a parallel and reverse direction to the seventh actuation beam, and having another end served as a fourth action end and an eighth piezoelectric film sandwiched between an eighth lower electrode and an eighth upper electrode, a first weak connection beam provided between the first action end and the movable electrode;

a second weak connection beam provided between the second action end and the movable electrode;

a third weak connection beam provided between the third action end and the movable electrode; and a fourth weak connection beam provided between the fourth action end and the movable electrode, the movable electrode being provided between the third action end and the fourth action end, the first and third actuation beams being placed on a first line, the second and fourth actuation beams being placed on a second line, the first and second actuation beams and the third and fourth actuation beams being placed symmetrically about a third line, the fifth and seventh actuation beams being placed on a fourth line, the sixth and eighth actuation beams being placed on a fifth line, the fifth and sixth actuation beams and the seventh and eighth actuation beams being placed symmetrically about the third line, and the first to fourth weak connection beams having bending stiffness smaller than bending stiffness of at least any of the first to eighth actuation beams and the movable electrode.

6. The capacitor according to claim 5, wherein a sum of lengths of the first and second connection beams and a sum of lengths of the third and fourth connection beams are equal to a length of the movable electrode, respectively.

7. A MEMS variable capacitor comprising:
a first actuation beam having one end fixed to a substrate, another end served as a first connection end and a first piezoelectric film sandwiched between a first lower electrode and a first upper electrode;
a second actuation beam having one end served as a second connection end connected to the first connection end, extending from the second connection end in a parallel and reverse direction to the first actuation beam, and having another end served as a first action end and a second piezoelectric film sandwiched between a second lower electrode and a second upper electrode;
a third actuation beam having one end fixed to the substrate, another end served as a third connection end and a third piezoelectric film sandwiched between a third lower electrode and a third upper electrode;
a fourth actuation beam having one end served as a fourth connection end connected to the third connection end, extending from the fourth connection end in a parallel and reverse direction to the third actuation beam, and having another end served as a second action end and a fourth piezoelectric film sandwiched between a fourth lower electrode and a fourth upper electrode;
a movable electrode provided between the first action end and the second action end, and having an equal thermal expansion coefficient to the substrate;
a fixed electrode provided on the substrate opposed to the movable electrode;
a fifth actuation beam having one end fixed to the substrate, another end served as a fifth connection end and a fifth piezoelectric film sandwiched between a fifth lower electrode and a fifth upper electrode;
a sixth actuation beam having one end served as a sixth connection end connected to the fifth connection end, extending from the sixth connection end in a parallel and reverse direction to the fifth actuation beam, and having one end served as a third action end and a sixth piezoelectric film sandwiched between a sixth lower electrode and a sixth upper electrode;
a seventh actuation beam having one end fixed to the substrate, another end served as a seventh connection end and a seventh piezoelectric film sandwiched between a seventh lower electrode and a seventh upper electrode;
an eighth actuation beam having one end served as an eighth connection end connected to the seventh connection end, extending from the eighth connection end in a parallel and reverse direction to the seventh actuation beam, and having another end served as a fourth action end and an eighth piezoelectric film sandwiched between an eighth lower electrode and an eighth upper electrode,
a first weak connection beam provided between the first action end and the movable electrode;
a second weak connection beam provided between the second action end and the movable electrode;
a third weak connection beam provided between the third action end and the movable electrode; and
a fourth weak connection beam provided between the fourth action end and the movable electrode,
the movable electrode being provided between the third action end and the fourth action end,
the first and third actuation beams being placed on a first line,
the second and fourth actuation beams being place on a second line,
the first and second actuation beams and the third and fourth actuation beams being placed symmetrically about a third line,
the fifth and seventh actuation beams being placed on a fourth line,
the sixth and eighth actuation beams being placed on a fifth line,
the fifth and sixth actuation beams and the seventh and eighth actuation beams being placed symmetrically about the third line, and
the first to fourth weak connection beams having bending stiffness smaller than bending stiffness of at least any of the first to eighth actuation beams and the movable electrode.

8. The capacitor according to claim 7, wherein a sum of lengths of the first and second connection beams and a sum of lengths of the third and fourth connection beams are equal to a length of the movable electrode, respectively.

* * * * *